(12) United States Patent
Ikami

(10) Patent No.: US 12,474,334 B2
(45) Date of Patent: Nov. 18, 2025

(54) TEST DEVICE AND CARTRIDGE

(71) Applicant: FUJIFILM Corporation, Tokyo (JP)

(72) Inventor: Seishi Ikami, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 663 days.

(21) Appl. No.: 17/893,252

(22) Filed: Aug. 23, 2022

(65) Prior Publication Data

US 2023/0066741 A1 Mar. 2, 2023

(30) Foreign Application Priority Data

Aug. 27, 2021 (JP) ................................. 2021-139215

(51) Int. Cl.
*G01N 33/543* (2006.01)
*B01L 3/00* (2006.01)

(52) U.S. Cl.
CPC ...... *G01N 33/54388* (2021.08); *B01L 3/5023* (2013.01); *B01L 2200/04* (2013.01);
(Continued)

(58) Field of Classification Search
CPC ....... G01N 33/54388; G01N 33/54387; G01N 2035/00108; G01N 2201/0256; G01N 2021/4776; G01N 2021/478; B01L 3/5023; B01L 2200/04; B01L 2300/069; B01L 2300/0825; B01L 2300/168; B01L 2400/0406; B01L 2200/16; B01L 2300/0672; B01L 2400/0683
See application file for complete search history.

(56) References Cited

U.S. PATENT DOCUMENTS 6,235,241 B1 * 5/2001 Catt ................... G01N 21/8483
422/430
2009/0084981 A1 * 4/2009 Bown ................ G01N 21/8806
235/375

(Continued)

FOREIGN PATENT DOCUMENTS

| JP | 10-274624 A | 10/1998 |
|---|---|---|
| JP | 2002-267664 A | 9/2002 |
| JP | 2016-503880 A | 2/2016 |

OTHER PUBLICATIONS

Japanese Office Action for corresponding Japanese Application No. 2021-139215, dated Apr. 15, 2025, with English translation.

*Primary Examiner* — Benjamin R Whatley
(74) *Attorney, Agent, or Firm* — Birch, Stewart, Kolasch & Birch, LLP

(57) ABSTRACT

A cartridge has a strip that is provided with the test region and a case in which the strip is accommodated and in which an observation window for observing the test region from an outside is formed in a surface. A emission end portion, through which illumination light for illuminating a test region, is disposed at a position separated from the observation window on a rear surface of the case. A detection unit, that optically detects the color development state of the test region irradiated with the illumination light, is disposed at a position facing the observation window on a surface side of the case. The illumination light is transmitted from the rear surface of the case to an inside of the case, reaches the test region while being diffuse-reflected by an inner surface of the case, and illuminates the test region from the surface side.

8 Claims, 14 Drawing Sheets

(52) U.S. Cl.
CPC . *B01L 2300/069* (2013.01); *B01L 2300/0825* (2013.01); *B01L 2300/168* (2013.01); *B01L 2400/0406* (2013.01)

(56) References Cited

U.S. PATENT DOCUMENTS

| | | | |
|---|---|---|---|
| 2014/0170757 A1* | 6/2014 | Tsai | G01N 21/8483 436/55 |
| 2016/0187333 A1 | 6/2016 | Moll et al. | |
| 2020/0209158 A1* | 7/2020 | Nikolaenko | G01N 21/27 |

* cited by examiner

DEVELOPMENT DIRECTION OF LYSATE
DOWNSTREAM SIDE ← UPSTREAM SIDE

TEST DEVICE AND CARTRIDGE

CROSS-REFERENCE TO RELATED APPLICATIONS

The present application claims priority under 35 U.S.C. § 119 to Japanese Patent Application No. 2021-139215 filed on Aug. 27, 2021. The above application is hereby expressly incorporated by reference, in its entirety, into the present application.

BACKGROUND

1. Technical Field

The technology of the present disclosure relates to a test device and a cartridge.

2. Description of the Related Art

In recent years, an immunochromatographic test using an immunochromatographic method has been actively performed. A cartridge is used in the immunochromatographic test. The cartridge has a strip and a case in which the strip is accommodated.

A lysate of a sample that can include a test substance, such as a nasal swab, is instilled to the strip. A labeling substance modified with a first binding substance that specifically binds to the test substance is immobilized on an instillation region of the lysate. The lysate is developed from the instillation region to one end of the strip by a capillary phenomenon. A test region including a second binding substance that specifically binds to the test substance to which the first binding substance has been bound is provided in the development destination of the lysate. An observation window for observing the test region from the outside is formed in a surface of the case.

In a case in which the individual who provided the sample has a virus infection or the like and the sample includes the test substance, a line indicating that the sample is positive appears in the test region. A test device has been proposed which analyzes an image obtained by imaging a test region through an observation window with an imaging element to identify a color development state of the test region such as whether or not the line appears and/or the degree of color development of the line (see, for example, JP2002-267664A).

The test device disclosed in JP2002-267664A includes an illumination unit that irradiates a test region with illumination light and an imaging element that images the test region irradiated with the illumination light through an observation window. The illumination unit includes a light source, such as a light emitting diode (LED) and a light guide that guides the illumination light emitted from the light source. An emission end portion of the light guide is disposed at a position corresponding to the test region on a rear surface side of a cartridge case. The illumination light emitted from the emission end portion of the light guide is transmitted through the case and the strip, reaches the test region, and illuminates the test region from the rear surface side. The imaging element is disposed at a position facing the observation window on a surface of the case which is opposite to the rear surface on which the emission end portion of the light guide is disposed.

SUMMARY

In the test device disclosed in JP2002-267664A, the test region is illuminated from the rear surface side as described above. Therefore, in a case in which impurities are mixed with the inside of the strip, there is a concern that the impurities will be reflected in the image captured by the imaging element and misidentification will occur.

An aspect is also considered in which the emission end portion is disposed next to the imaging element and the test region is irradiated with the illumination light in an oblique direction. However, even in this aspect, there is a concern that a sufficient amount of illumination light will not reach the test region due to, for example, the eclipse of the illumination light at the edge of the observation window, which results in misidentification.

One embodiment according to the technology of the present disclosure provides a test device and a cartridge that can reduce a concern that a color development state of a test region will be misidentified.

According to an aspect of the present disclosure, there is provided a test device that is used for an immunochromatographic test using an immunochromatographic method. The test device comprises: a loading portion into which a cartridge is loaded, the cartridge having a strip that is provided with a test region whose color development state changes depending on whether or not a sample includes a test substance and having a case in which the strip is accommodated and in which an observation window for observing the test region from an outside is formed in a surface; an illumination unit having an emission end portion through which illumination light for illuminating the test region is emitted and which is disposed at a position separated from the observation window on an outer surface of the case; and a detection unit that is disposed at a position facing the observation window on a surface side of the case and that optically detects the color development state of the test region irradiated with the illumination light. The illumination unit is configured such that the illumination light is transmitted from the outer surface of the case to an inside of the case, reaches the test region while being diffuse-reflected by an inner surface of the case, and illuminates the test region from the surface side.

Preferably, the emission end portion is disposed at a position that deviates from the test region in a direction along a short side of the case on a rear surface of the case which is opposite to the surface in which the observation window is formed.

Preferably, two emission end portions are provided, and the two emission end portions are disposed at positions of both end portions of the short side of the case with a position corresponding to the test region interposed therebetween.

Preferably, the emission end portion comes into contact with the outer surface of the case.

Preferably, the test device further comprises a suppression portion that suppresses leakage light of the illumination light from the emission end portion to surroundings.

Preferably, the suppression portion is a light-shielding elastic member having one end that constitutes a part of the emission end portion and is elastically deformed when the one end comes into contact with the outer surface of the case.

Preferably, the illumination unit has a semiconductor light source that emits the illumination light.

According to another aspect of the present disclosure, there is provided a cartridge that is loaded into the loading portion of the above-described test device. The case is made of a material that transmits the illumination light incident from the outer surface to the inside and that diffuse-reflects the transmitted illumination light from an inner surface.

Preferably, a diffused light transmittance of the material forming the case is equal to or greater than 0.1% and equal to or less than 50% for light having a specific wavelength when a transmission distance is 2 mm.

Preferably, a diffused light transmittance of the material forming the case is equal to or greater than 1% and equal to or less than 40% for light having a wavelength of 420 nm to 680 nm when a transmission distance is 2 mm.

According to the technology of the present disclosure, it is possible to provide a test device and a cartridge that can reduce the concern that the color development state of the test region will be misidentified.

BRIEF DESCRIPTION OF THE DRAWINGS

Exemplary embodiments according to the technique of the present disclosure will be described in detail based on the following figures, wherein.

DETAILED DESCRIPTION

First, a configuration of a cartridge 10 used in an immunochromatographic test using an immunochromatographic method will be described.

Figure 1:
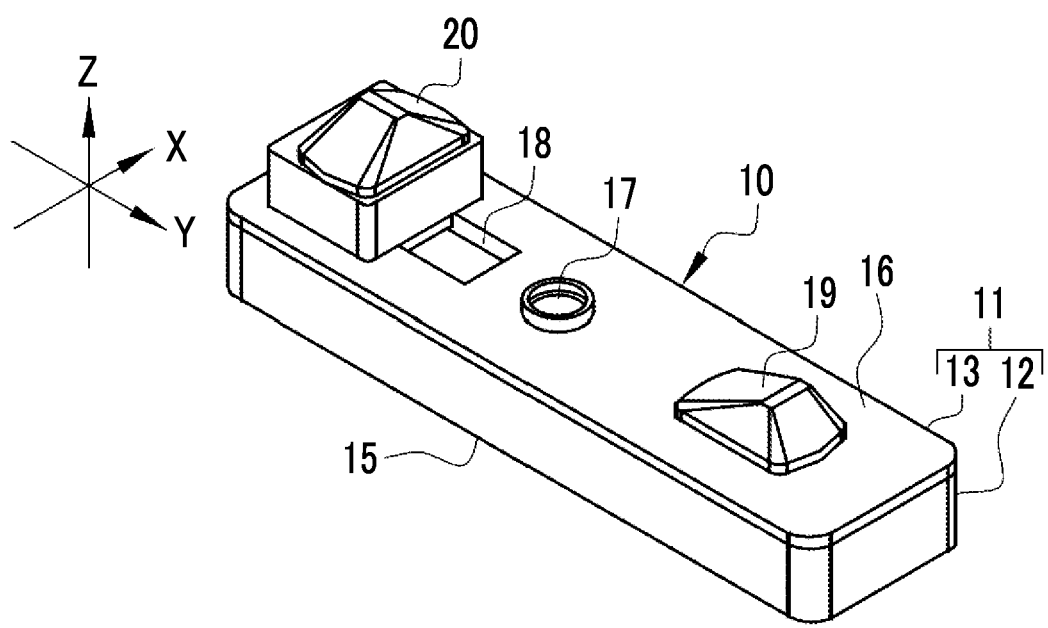
FIG. 1 is a perspective view illustrating a cartridge.
Figure 2:
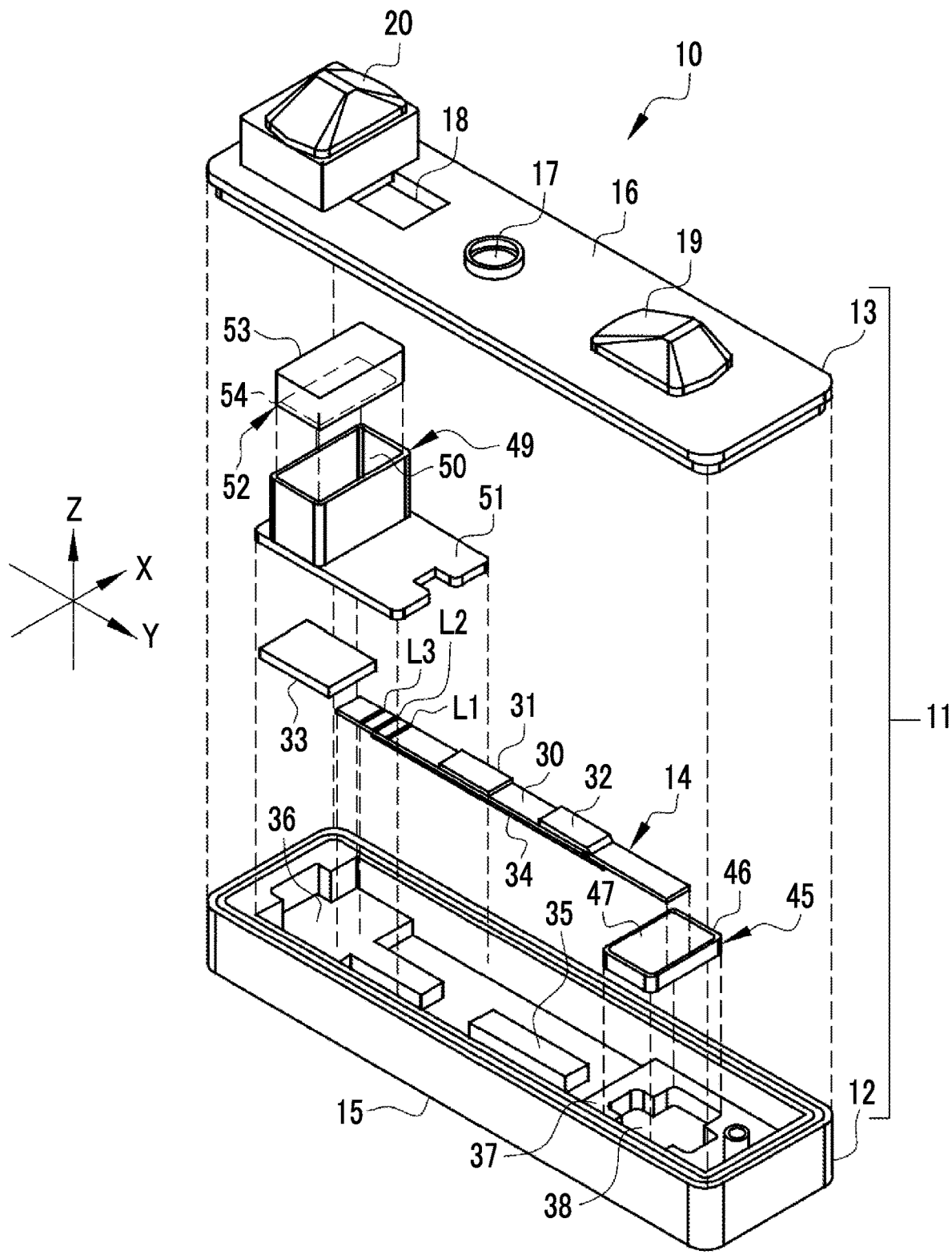
FIG. 2 is an exploded perspective view illustrating the cartridge.

For example, as illustrated in FIGS. 1 and 2, the cartridge 10 is a disposable type that is used one by one for each sample and includes a case 11 having an elongated rectangular parallelepiped shape. The case 11 is made of a translucent material. The case 11 includes a case main body 12 and a cover member 13. The case main body 12 is a box having an accommodation space that is surrounded by a bottom plate having an elongated rectangular plate shape and four side plates provided vertically from four sides of the bottom plate. A strip 14 that is provided with a test region L1 is accommodated in the accommodation space of the case main body 12. A rear surface of the bottom plate of the case main body 12 is a rear surface 15 of the case 11. The rear surface 15 is an example of an "outer surface of a case" according to the technology of the present disclosure.

The cover member 13 has an elongated rectangular plate shape similar to the bottom plate of the case main body 12 and functions as a lid that covers the accommodation space of the case main body 12. A surface of the cover member 13 is a surface 16 of the case 11. The surface 16 is also an example of the "outer surface of the case" according to the technology of the present disclosure. In addition, both an X direction and a Y direction in the drawings are directions along a horizontal plane and are orthogonal to each other. The X direction is a direction along a short side of the case 11 and is a so-called left-right direction. The Y direction is a direction along a long side of the case 11 and is a so-called front-rear direction. A Z direction is a direction along a vertical direction and is orthogonal to the X direction and the Y direction. The Z direction is a so-called up-down direction.

A dropping port 17 and an observation window 18 are formed in the cover member 13. In addition, the cover member 13 is provided with a first pressing operation portion 19 and a second pressing operation portion 20. The dropping port 17, the observation window 18, the first pressing operation portion 19, and the second pressing operation portion 20 are integrally molded.

The dropping port 17 is a round hole into which a lysate of a sample (hereinafter, simply referred to as a lysate) 72 (see FIG. 6) is dropped and has a boss shape in which an edge protrudes from the surface 16. The dropping port 17 is formed in a central portion of the cover member 13. In addition, the sample is not particularly limited, and any sample may be used as long as it can include a test substance 73 (see FIG. 6). Examples of the sample include samples from individuals to be subjected to the immunochromatographic test, especially, animals and human biological samples, such as blood, serum, plasma, spinal fluid, tears, sweat, urine, stool, pus, nasal discharge, nasal swabs, pharyngeal swabs, nasal aspirates, sputum, organs, tissues, mucous membranes, skin, swabs containing them, flora and fauna, and dried bodies thereof. Examples of the test substance 73 include antigens, antibodies, proteins, and low-molecular-weight compounds.

The observation window 18 is a rectangular opening for observing, for example, the test region L1 of the strip 14 from the outside. The observation window 18 is formed between the dropping port 17 and the second pressing operation portion 20.

The first pressing operation portion 19 is provided in one end portion of the cover member 13 in the Y direction. The first pressing operation portion 19 is pressed by a user in a case in which a first reagent 48 (see FIG. 3) is supplied to the strip 14. The second pressing operation portion 20 is provided in the other end portion of the cover member 13 which is opposite to the first pressing operation portion 19 in the Y direction. The second pressing operation portion 20 is pressed by the user in a case in which a second reagent 55 (see FIG. 3) is supplied to the strip 14.

The strip 14 has an elongated rectangular plate shape as a whole and has a carrier 30, a label holding pad 31, a liquid feeding pad 32, an absorption pad 33, and a back pressure-sensitive adhesive sheet 34.

The carrier 30 is made of a porous insoluble material such as a nitrocellulose membrane. The label holding pad 31 is attached to a position of the carrier 30 which faces the dropping port 17. The lysate 72 added dropwise to the dropping port 17 is instilled to the label holding pad 31. That is, the label holding pad 31 functions as an instillation region of the lysate 72.

The lysate 72 instilled to the label holding pad 31 permeates the carrier 30 and develops to one end of the carrier 30 in the Y direction via a capillary phenomenon. The test region L1, a control region L2, and a color development region L3 are provided on one end side of the carrier 30 on which the lysate 72 develops in the Y direction. The test region L1, the control region L2, and the color development region L3 are strip-shaped regions that extend from one end to the other end of the carrier 30 in the X direction. In a case in which the direction from the label holding pad 31 to the test region L1 and the like is a development direction of the lysate 72 (see FIG. 3), the test region L1 is located on the most upstream side in the development direction, and the color development region L3 is located on the most downstream side in the development direction. The control region L2 is located between the test region L1 and the color development region L3. In other words, the control region L2 is located on the downstream side of the test region L1 and on the upstream side of the color development region L3. In addition, in FIG. 2, the test region L1, the control region L2, and the color development region L3 are hatched. However, this hatching is performed for convenience of explanation and does not show that each of the regions L1 to L3 is colored. This applies to FIGS. 3 to 5 and 9 and the like which will be described below.

The liquid feeding pad 32 is attached to the other end of the carrier 30 which is opposite to the one end of the carrier 30 where the test region L1 and the like are provided. The liquid feeding pad 32 is made of a porous material, similarly to the carrier 30 and the like, and feeds the first reagent 48 to the carrier 30 via the capillary phenomenon.

The absorption pad 33 is attached to the one end of the carrier 30 where the test region L1 and the like are provided. The absorption pad 33 is also made of a porous material. The absorption pad 33 absorbs the lysate 72, the first reagent 48, and the second reagent 55 which are developed on the carrier 30. Since the lysate 72 and the like are positively absorbed by the absorption pad 33 in this way, the development speed of the lysate 72 and the like is increased.

The back pressure-sensitive adhesive sheet 34 is a substrate whose surface is a pressure-sensitive adhesive surface, and the carrier 30 is adhesively fixed to the back pressure-sensitive adhesive sheet 34. The back pressure-sensitive adhesive sheet 34 and thus the strip 14 are placed on protruding support tables 35 and 36 that are formed in the accommodation space of the case main body 12. The support table 35 is provided in the central portion of the case main body 12. The support table 36 is provided in one end portion of the case main body 12 on the downstream side in a deployment direction of the lysate 72. The support tables 35 and 36 are at the same height.

A protruding support table 37 is also formed in the other end portion of the case main body 12 on the upstream side in the deployment direction of the lysate 72. The support table 37 is at the same height as the support tables 35 and 36. The liquid feeding pad 32 is placed on the support table 37.

A first accommodation portion 38 having a recessed shape is formed in the support table 37. The first accommodation portion 38 is provided at a position that faces the other end of the liquid feeding pad 32 which is opposite to one end attached to the carrier 30. A first reagent holding portion 45 is accommodated in the first accommodation portion 38.

The first reagent holding portion 45 includes a container 46 that has an opening in one surface and a seal 47 that tightly covers the opening of the container 46. The container 46 is made of, for example, a resin material. The first reagent 48 is stored inside the container 46. The seal 47 is, for example, an aluminum sheet and can be easily broken by a sharp blade and the like. The first reagent holding portion 45 is accommodated in the first accommodation portion 38 with the seal 47 facing upward such that the seal 47 faces the other end of the liquid feeding pad 32.

A multifunctional member 49 is disposed above the support table 36. The multifunctional member 49 is made of a transparent resin material such as an acrylic resin. The multifunctional member 49 is a member in which a second accommodation portion 50 and a flow path forming portion 51 are integrally provided. The second accommodation portion 50 is a box having an open upper surface, and a second reagent holding portion 52 is accommodated in the second accommodation portion 50. The flow path forming portion 51 is a flat plate that extends from the bottom of the second accommodation portion 50 in the Y direction. The flow path forming portion 51 extends to a front side of the label holding pad 31 and covers an upper side of the test region L1, the control region L2, and the color development region L3 of the carrier 30. There is a gap D between the carrier 30 and the flow path forming portion 51 (see FIG. 3). The gap D is, for example, in the range of 0.01 mm to 1 mm. The gap D is provided between the carrier 30 and the flow path forming portion 51 in this way such that a flow path of the second reagent 55 is secured.

The second reagent holding portion 52 includes a container 53 that has an opening in one surface and a seal 54 that tightly covers the opening of the container 53. The container 53 is made of, for example, a resin material. The second reagent 55 is stored inside the container 53. The seal 54 is, for example, an aluminum sheet and can be easily broken by a sharp blade or the like. The second reagent holding portion 52 is accommodated in the second accommodation portion 50 with the seal 54 facing downward such that the seal 54 faces the strip 14.

Figure 3:
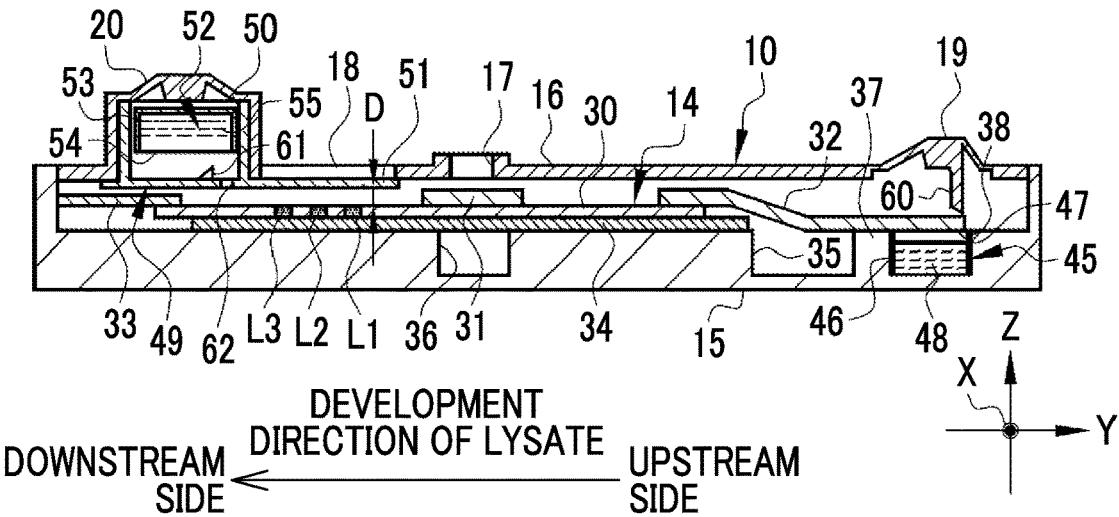
FIG. 3 is a broken side view illustrating the cartridge.

For example, as illustrated in FIG. 3, the first pressing operation portion 19 is provided with a first breaking protrusion 60. The second reagent holding portion 52 is attached to an inner surface of the second pressing operation portion 20. A second breaking protrusion 61 and a supply port 62 are provided at the bottom of the second accommodation portion 50. The first breaking protrusion 60 and the second breaking protrusion 61 have sharp tips.

Figure 4:
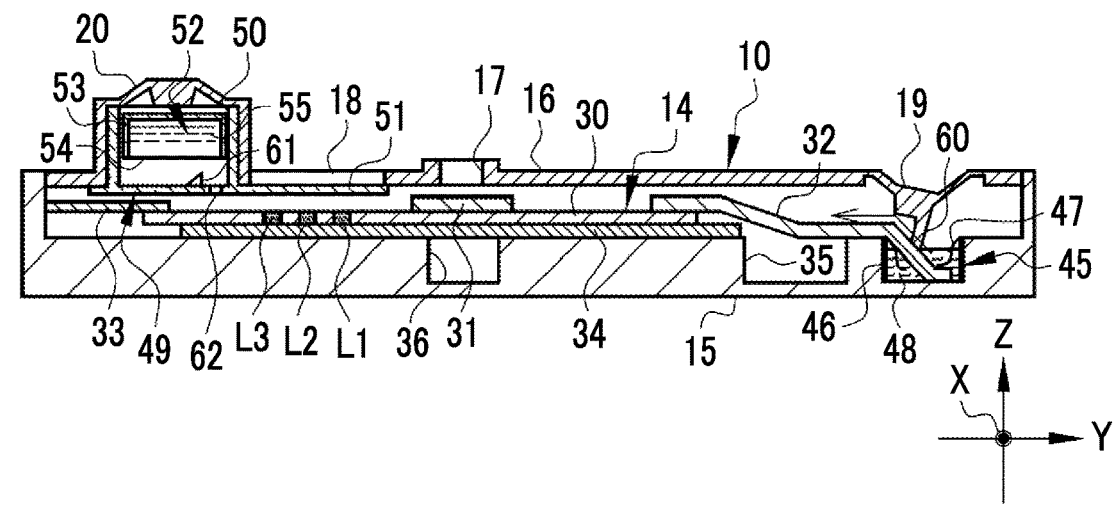
FIG. 4 is a broken side view of the cartridge illustrating a state in which a first pressing operation portion is pressed.

For example, as illustrated in FIG. 4, in a case in which the first pressing operation portion 19 is pressed, the first breaking protrusion 60 comes into contact with the other end of the liquid feeding pad 32 to press the other end of the liquid feeding pad 32 toward the seal 47 of the first reagent holding portion 45. The seal 47 is broken by the pressing of the other end of the liquid feeding pad 32 by the first breaking protrusion 60, and the other end of the liquid feeding pad 32 is dropped into the container 46 and is immersed in the first reagent 48. The first reagent 48 is developed from the other end of the liquid feeding pad 32 to the carrier 30 by the capillary phenomenon. The first pressing operation portion 19 is maintained in a crushed state even after being crushed by the pressing operation. Therefore, the development of the first reagent 48 is continued until almost all of the first reagent 48 is sucked up by the liquid feeding pad 32.

Figure 5:
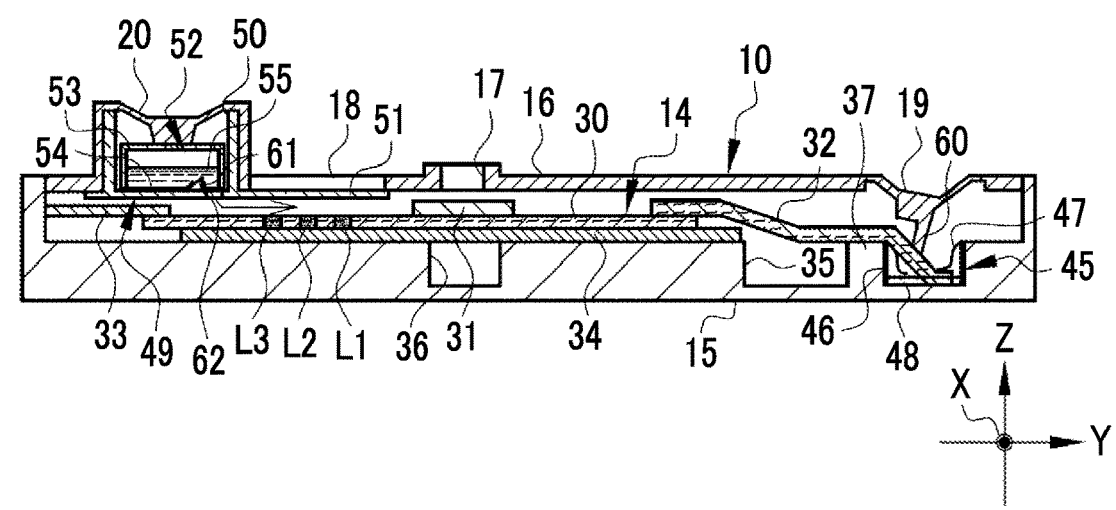
FIG. 5 is a broken side view of the cartridge illustrating a state in which a second pressing operation portion is pressed in addition to the first pressing operation portion.

For example, as illustrated in FIG. 5, in a case in which the second pressing operation portion 20 is pressed, the second reagent holding portion 52 is moved downward in the second accommodation portion 50 and reaches the bottom of the second accommodation portion 50 having the second breaking protrusion 61. Then, the seal 54 of the second reagent holding portion 52 is broken by the second breaking protrusion 61. The second reagent 55 stored in the second reagent holding portion 52 flows from a broken portion of the seal 54 to the supply port 62, further flows through the flow path secured by the gap D (see FIG. 3), and is supplied to the carrier 30.

Figure 6:
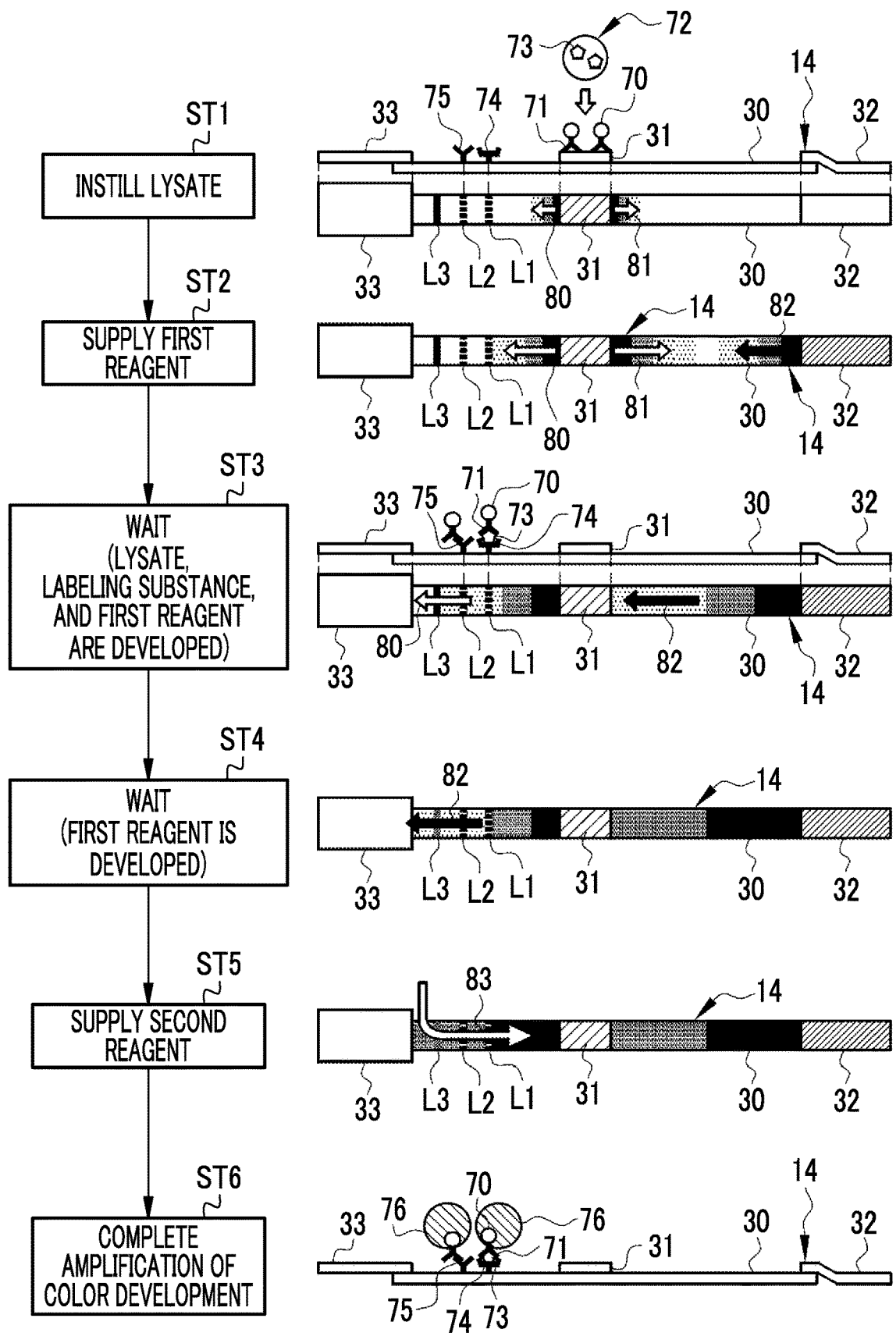
FIG. 6 is a diagram illustrating a procedure of an immunochromatographic test using the cartridge.

For example, as illustrated in FIG. 6, a labeling substance 70 is fixed to the label holding pad 31. The labeling substance 70 is modified with a first binding substance 71. The first binding substance 71 specifically binds to the test substance 73 included in the lysate 72. In this embodiment, for example, gold colloidal particles having a diameter of 50 nm (manufactured by BBI Solutions, product code: EM.GC50) are used as the labeling substance 70. In addition, the labeling substance 70 is not limited to the gold colloidal particles and may be, for example, metal sulfides used in the immunochromatographic method or coloring particles used in immune agglutination. In particular, it is preferable that the labeling substance 70 is a metal colloid. Examples of the metal colloid include a silver colloid, a platinum colloid, an iron colloid, an aluminum hydroxide colloid, and composite colloids thereof, in addition to the above-mentioned gold colloid. In particular, the gold colloid and the silver colloid are preferable in that the gold colloid shows a red color and the silver colloid shows a yellow color at an appropriate particle size. Of the two colloids, the gold colloid is most preferable.

The first binding substance 71 is, for example, an antibody against an antigen in a case in which the test substance 73 is the antigen and is an antigen against an antibody in a case in which the test substance 73 is the antibody. In a case in which the test substance 73 is a protein, a low-molecular-weight compound, or the like, the first binding substance 71 is an aptamer for the protein, the low-molecular-weight compound, or the like.

The test region L1 includes a second binding substance 74. The second binding substance 74 specifically binds to the test substance 73 to which the first binding substance 71 has been bound. Therefore, the test substance 73 is captured in the test region L1. In a case in which the test substance 73 is captured, the color optical density of the test region L1 increases to be equal to or greater than a preset standard. It can be seen that the sample includes the test substance 73, that is, the sample is positive in a case in which the color optical density of the test region L1 increases to be equal to or greater than the standard.

Before the lysate 72 is developed, the test region L1 has substantially the same color (for example, white) as the carrier 30. In a case in which the lysate 72 is developed and the test substance 73 is included in the developed lysate 72, that is, the sample is positive, the color optical density of the test region L1 increases, and the test region L1 appears as a line. Since the test region L1 is amplified by silver amplification which will be described below, it is colored in black.

In addition, a change in the color development state of the test region L1 includes any of discoloration, color development, or density change. The discoloration is an aspect in which the color changes from a first color different from the color of the carrier 30 to another second color. The color development is an aspect in which a color different from the color of the carrier 30 is developed such that the color of the carrier 30 is changed to another color. The density change is an aspect in which the color optical density changes.

Similar to the first binding substance 71, the second binding substance 74 is, for example, an antibody against an antigen in a case in which the test substance 73 is the antigen and is an antigen against an antibody in a case in which the test substance 73 is the antibody. In a case in which the test substance 73 is a protein, a low-molecular-weight compound, or the like, the second binding substance 74 is an aptamer for the protein, the low-molecular-weight compound, or the like. The first binding substance 71 and the second binding substance 74 may be the same or different. For example, in a case in which the test substance 73 is an influenza A virus or a biomarker thereof, an anti-influenza A monoclonal antibody (manufactured by Medix Biochemica, product name: Anti-Influenza A SPT N-5 7307) can be used as the first binding substance 71 and the second binding substance 74.

The control region L2 includes a third binding substance 75. The third binding substance 75 specifically binds to the first binding substance 71. Therefore, the labeling substance 70 is captured in the control region L2. In some labeling substances 70, the first binding substance 71 does not bind to the test substance 73. The labeling substance 70 reaches the control region L2 without being captured in the test region L1 and is captured in the control region L2. In a case in which the labeling substance 70 is captured, the color optical density of the control region L2 increases to be equal to or greater than a preset standard. It can be seen that the lysate 72 is sufficiently developed on the carrier 30 and that the development of the lysate 72 is completed in a case in which the color optical density of the control region L2 increases to be equal to or greater than the standard.

Similar to the test region L1, the control region L2 also has substantially the same color (for example, white) as the carrier 30 before the lysate 72 is developed. In a case in which the labeling substance 70 is captured, the color optical density of the control region L2 increases, and the control region L2 appears as a line. Since the control region L2 is also amplified by silver amplification which will be described below, it is colored in black.

The third binding substance 75 may be the test substance 73 or may be a compound having a part that is recognized by the first binding substance 71. An example of the compound having the part recognized by the first binding substance 71 is a compound in which a derivative of the test substance 73 and a protein are bound to each other. For example, in a case in which the test substance 73 is an influenza A virus or a biomarker thereof, an anti-mouse IgG antibody (manufactured by Fujifilm Wako Pure Chemical Corporation, product name: anti-mouse IgG (H+L), Rabbit F (ab') 2, product code: 566-70621) can be used as the third binding substance 75.

The color development region L3 includes a substance (not illustrated) whose color development state is changed by reacting with the first reagent 48. It can be seen that the first reagent 48 is developed to the color development region L3 and that it is time to start the supply of the second reagent 55 in a case in which the color development region L3 reacts with the first reagent 48 to be colored or in a case in which the color is changed. For example, in a case in which a mixed aqueous solution of an iron nitrate aqueous solution and citric acid, manufactured by Fujifilm Wako Pure Chemical Corporation (product code: 038-06925), is used as the first reagent 48, it is preferable that the color development region L3 is configured by a coloring-reagent-immobilized line in which bromocresol green, manufactured by Fujifilm Wako Pure Chemical Corporation, has been immobilized in a strip shape. In this case, the color development region L3 is dark green before reacting with the first reagent 48 and changes to orange in a case in which the first reagent 48 reaches the color development region L3.

The first reagent 48 and the second reagent 55 are amplifying liquids that react with each other to amplify the color development of the test region L1 and the control region L2. In a case in which a metal-based substance, such as gold colloidal particles, is used as the labeling substance 70 as in this example, the silver amplification is used as a method for amplifying color development. For example, the first reagent 48 and the second reagent 55 are amplifying liquids that are used for the silver amplification. The reaction of the first reagent 48 and the second reagent 55 using the labeling substance 70 as a catalyst is an amplification reaction. Silver particles 76 having a particle size relatively larger than that of the labeling substance 70 are generated by the amplification reaction.

Specifically, the first reagent 48 is a solution of a reducing agent that reduces silver ions, and the second reagent 55 is a solution of silver ions. In a case in which the reducing agent in the first reagent 48 and the silver ion in the second reagent 55 are brought into contact with the labeling substance 70, the silver particles 76 are generated. The silver particles 76 are deposited on the labeling substance 70 with the labeling substance 70 as a nucleus. The silver particles 76 deposited on the labeling substance 70 will eventually have a particle size that is tens to hundreds of times larger than that of the labeling substance 70. Therefore, a labeling signal emitted by the labeling substance 70 is amplified. As a result, the color development of the test region L1 and the control region L2 is amplified.

As the reducing agent of the first reagent 48, any material may be used as long as it can reduce silver ions to silver. For example, an inorganic or organic material or a mixture thereof can be used. A reducing metal salt or a reducing metal complex salt whose valence can be changed by a metal ion, such as $Fe^{2+}$, $V^{2+}$, or $Ti^{3+}$, can be preferably given as an example of the inorganic reducing agent. In a case in which the inorganic reducing agent is used, it is necessary to detoxify the oxidized ions by performing complex formation on the oxidized ions or by reducing the oxidized ions to be removed. For example, in a case in which $Fe^{2+}$ is used as the reducing agent, it can be detoxified by using citric acid or ethylenediaminetetraacetic acid (EDTA) to form a complex of $Fe^{3+}$ which is an oxide. In this example, it is preferable to use this inorganic reducing agent as the reducing agent. It is more preferable to use a metal salt of $Fe^{2+}$.

In addition, the following can be used as the reducing agent: a developing agent used in a wet silver halide photographic sensitive material (for example, methyl gallic acid, hydroquinone, substituted hydroquinone, 3-pyrazolidones, p-aminophenols, p-phenylenediamines, hindered phenols, amidoximes, azines, catechols, pyrogallols, ascorbic acid (or its derivatives), and leuco pigments); and other materials apparent to those skilled in the art such as the materials described in U.S. Pat. No. 6,020,117B.

An ascorbic acid reducing agent is also preferable as the reducing agent. Useful ascorbic acid reducing agents include ascorbic acid analogs, isomers, and derivatives thereof. For example, the following can be preferably given as an example of the ascorbic acid reducing agent: D-ascorbic acid or L-ascorbic acid and sugar derivatives thereof (for example, γ-lactoascorbic acid, glucoascorbic acid, fucoascorbic acid, glucoheptascorbic acid, and maltoascorbic acid); sodium salt of ascorbic acid, potassium salt of ascorbic acid, and isoascorbic acid (or L-erythroascorbic acid); salts thereof (for example, an alkali metal salt, an ammonium salt or salts known in the art); endiol-type ascorbic acid; enol-type ascorbic acid; and thio-enol-type ascorbic acid. In particular, D-ascorbic acid or L-ascorbic acid (and alkali metal salts thereof) or isoascorbic acid (or alkali metal salts thereof) is preferable, and sodium salts are preferable salts. A mixture of these reducing agents can be used as needed.

The second reagent 55 is preferably a reagent in which a silver ion-containing compound is dissolved in a solvent. An organic silver salt, an inorganic silver salt, or a silver complex can be used as the silver ion-containing compound. It is preferable that the silver ion-containing compound is an inorganic silver salt or a silver complex. A silver ion-containing compound having high solubility in a solvent, such as water, can be used as the inorganic silver salt. Examples of the inorganic silver salt include silver nitrate, silver acetate, silver lactate, silver butyrate, and silver thiosulfate. Silver nitrate is particularly preferable. It is preferable that the silver complex is a silver complex coordinated to a ligand having a water-soluble group such as a hydroxyl group or a sulfone group. Hydroxythioether silver is given as an example of the silver complex.

Hereinafter, a procedure of the immunochromatographic test by the cartridge 10 will be described with reference to FIG. 6. Here, a case in which the sample includes the test substance 73, that is, a case in which the sample is positive, will be described as an example. In addition, in FIG. 6, the back pressure-sensitive adhesive sheet 34 is not illustrated.

First, as illustrated in Step ST1, the lysate 72 is instilled into the label holding pad 31. The test substance 73 in the lysate 72 instilled into the label holding pad 31 specifically binds to the first binding substance 71 that modifies the labeling substance 70 of the label holding pad 31. The lysate 72 permeates through the carrier 30 from the label holding pad 31 and is developed to the side (downstream side) of the test region L1 and the like by the capillary phenomenon as represented by an arrow 80. A part of the lysate 72 is also developed to the side (upstream side) of the liquid feeding pad 32 as represented by an arrow 81.

Then, as illustrated in Step ST2, the first reagent 48 is supplied by the operation of pressing the first pressing operation portion 19. As represented by an arrow 82, the first reagent 48 is supplied to the carrier 30 from the liquid feeding pad 32 and is developed to the side (downstream side) of the test region L1 and the like by the capillary phenomenon.

Then, as illustrated in Step ST3, the lysate 72, the labeling substance 70, and the first reagent 48 are developed. The lysate 72 and the labeling substance 70 that are being developed from the label holding pad 31 are developed to the side of the test region L1 and the like so as to be swept away by the first reagent 48. Then, as illustrated in Step ST4, the first reagent 48 finally reaches the color development region L3. The color development region L3 reacts with the first reagent 48 such that the color development state changes. In this example, the color development region L3 is dark green before reacting with the first reagent 48 and is changed to orange by reacting with the first reagent 48.

The test substance 73 that has reached the test region L1, specifically, the labeling substance 70 bound to the test substance 73 through the first binding substance 71, is captured by the second binding substance 74 in the test region L1. Therefore, the color optical density of the test region L1 increases to be equal to or greater than the standard. On the other hand, the labeling substance 70 that has not been bound to the test substance 73 passes through the test region L1 without being captured by the second binding substance 74 and is captured by the third binding substance 75 in the control region L2. Therefore, the color optical density of the control region L2 increases to be equal to or greater than the standard.

The user performs the operation of pressing the first pressing operation portion 19 to develop the first reagent 48 and then waits until the first reagent 48 reaches the color development region L3 and the color development state of the color development region L3 changes (Steps ST3 and ST4). In a case in which the user visually recognizes that the color development state of the color development region L3 has changed through the observation window 18, the user presses the second pressing operation portion 20.

As illustrated in Step ST5, the second reagent 55 is supplied by the operation of pressing the second pressing operation portion 20. As represented by an arrow 83, the second reagent 55 is supplied to the carrier 30 from the downstream side of the color development region L3 and is developed to the side (upstream side) of the liquid feeding pad 32. As illustrated in Step ST6, the silver particles 76 are generated with the labeling substance 70 captured in the test region L1 and the control region L2 as the nucleus by the silver ions included in the second reagent 55 and the reducing agent included in the first reagent 48. The color development of the test region L1 and the control region L2 is amplified by the silver particles 76. As described above, the cartridge 10 has a configuration that enables the user to visually recognize whether or not the sample is positive, without using a test device 100 (see FIG. 8).

Figure 7:
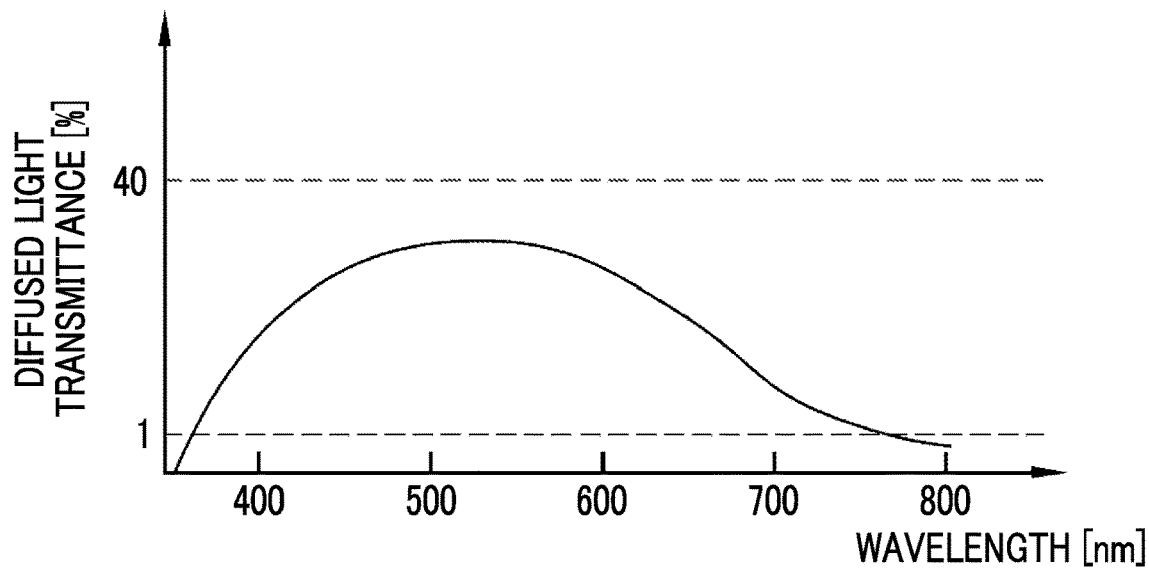
FIG. 7 is a graph illustrating a diffused light transmittance of a translucent material forming a case.

For example, as illustrated in FIG. 7, the diffused light transmittance of the translucent material forming the case 11 is equal to or greater than 1% and equal to or less than 40% for visible light having a wavelength of 420 nm to 680 nm when a transmission distance is 2 mm.

Here, the diffused light transmittance of the translucent material is the ratio of diffused components, which are diffused in the translucent material and are emitted from the translucent material, to incident rays that are incident on the translucent material. Some of the incident rays travel straight through the translucent material. The ratio of the straight components emitted from the translucent material is called "parallel light transmittance". For example, the parallel light transmittance of the translucent material forming the case 11 for visible light having a wavelength of 420 nm to 680 nm is equal to or less than 0.1%. That is, in FIG. 7, the diffused light transmittance in the wavelength range of 420 nm to 680 nm is at least equal to or greater than 10% in the entire range. Therefore, a parallel light transmittance of 0.1% or less means that most of the rays transmitted through the translucent material are the diffused components in the entire wavelength range of 420 nm to 680 nm.

Further, the total value of the diffused light transmittance and the parallel light transmittance is called total light transmittance. That is, the total light transmittance of the translucent material is the ratio of all of the rays transmitted through the translucent material and emitted from the translucent material to the incident rays that are incident on the translucent material from a light source.

The total light transmittance can be measured using, for example, an integrating sphere. As is well known, the integrating sphere is a hollow sphere whose inner surface is a reflecting surface and is a measurement instrument for spatially integrating straight components and diffused components of the rays transmitted through the translucent material using reflection from the inner surface. The amount of light integrated in the integrating sphere can be measured to measure the amount of rays transmitted through the translucent material.

The total light transmittance is measured while changing the wavelength of the light to be measured in the range of, for example, about 400 nm to 800 nm. On the other hand, for the parallel light transmittance, only the straight component, which travels straight through the translucent material, among the incident rays is measured without using the integrating sphere. For example, in a measurement device that measures the amount of light, the straight component can be measured by attaching a mask to a light receiving surface of a light receiving unit such that only the straight component of the transmitted rays is incident on the light receiving unit. The parallel light transmittance is also measured while changing the wavelength of the light to be measured in the range of about 400 nm to 800 nm. The diffused light transmittance is a value obtained by subtracting the parallel light transmittance from the total light transmittance measured in this way. A graph illustrated in FIG. 7 illustrates the diffused light transmittance calculated in this way. The transmission distance is a distance that the incident ray travels through the translucent material. For example, in a case in which the translucent material has a plate shape, the transmission distance is the thickness of the plate-shaped translucent material. A transmission distance of 2 mm means that the thickness of the translucent material used for measuring the total light transmittance is 2 mm. The translucent material is, for example, a resin material.

The light transmission characteristics illustrated in FIG. 7 are the light transmission characteristics of a resin material which is so-called milky white. For the resin material having the light transmission characteristics illustrated in FIG. 7, white light can be used as illumination light LL (see FIG. 10) for illuminating the test region L1. In addition, green light having a center wavelength of about 550 nm can be used as the illumination light LL. Further, red light having a center wavelength of about 650 nm can be used as the illumination light LL.

Next, the configuration of the test device 100 that performs the immunochromatographic test will be described.

Figure 8:
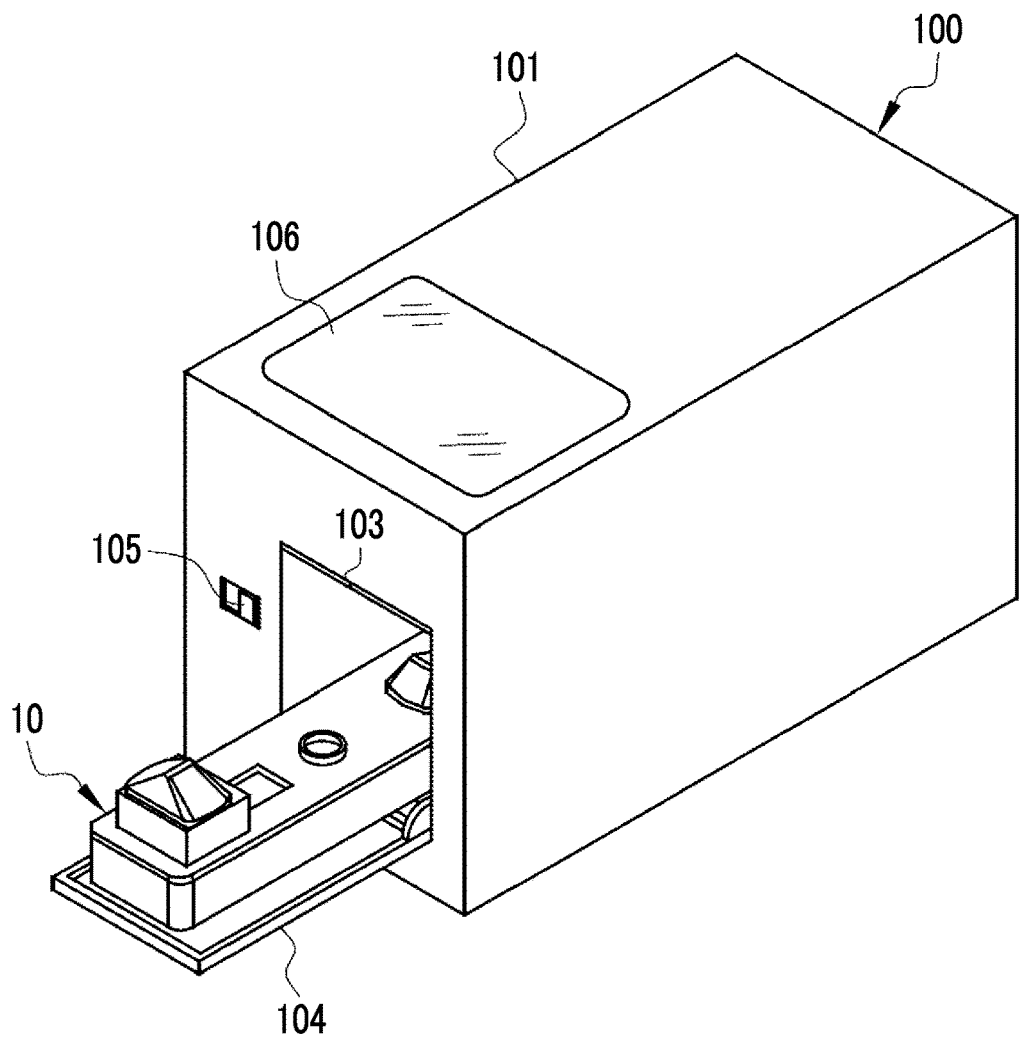
FIG. 8 is a perspective view illustrating a test device.
Figure 9:
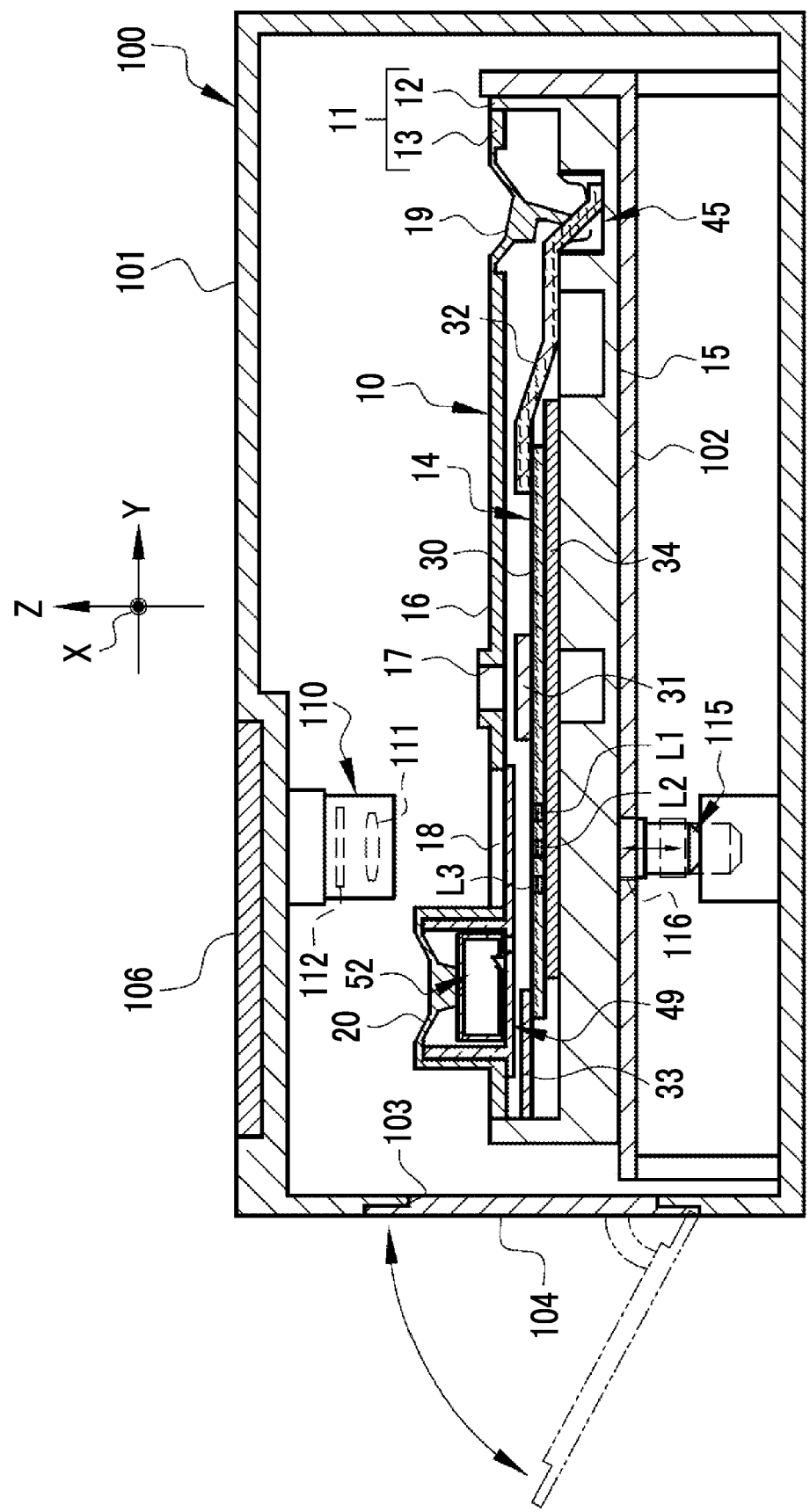
FIG. 9 is a cross-sectional view illustrating the inside of the test device.

For example, as illustrated in FIGS. 8 and 9, the test device 100 comprises a housing 101 having a rectangular parallelepiped shape. A loading portion 102 which is an L-shaped tray and into which the cartridge 10 is loaded is provided in the housing 101.

A loading port 103 for the cartridge 10 is formed in a front surface of the housing 101. Further, an openable and closable lid 104 that covers the loading port 103 is attached to the front surface of the housing 101. Furthermore, a power switch 105 for the test device 100 is disposed on the front surface of the housing 101.

A touch panel display 106 is attached to an upper surface of the housing 101. The touch panel display 106 receives an operation instruction such as a user's instruction to start the immunochromatographic test (hereinafter, referred to as a test start instruction). In addition, the touch panel display 106 displays information such as an identification result 156 (see FIG. 12) of the color development state of the test region L1. Further, examples of the color development state of the test region L1 include whether or not a line appears in the test region L1 and/or the degree of color development of the line.

The user opens the lid 104 to expose the loading port 103 and loads the cartridge 10, which has been subjected to the process in Step ST6 illustrated in FIG. 6, into the loading portion 102 through the loading port 103. Then, the user closes the lid 104 and operates the touch panel display 106 to input the test start instruction.

In FIG. 9, a detection unit 110 is provided in the housing 101. The detection unit 110 is disposed at a position that faces the observation window 18 in the surface 16 of the case 11. The detection unit 110 optically detects the color development state of the test region L1, the control region L2, and the color development region L3. Specifically, the detection unit 110 is a camera having an imaging lens 111 and an imaging element 112. The imaging lens 111 forms an image of the test region L1, the control region L2, and the color development region L3 through the observation window 18. The imaging element 112 captures the image formed by the imaging lens 111. The imaging element 112 is a charge coupled device (CCD) image sensor or a complementary metal oxide semiconductor (CMOS) image sensor.

In addition, an illumination unit 115 is provided in the housing 101. The illumination unit 115 is disposed on the rear surface 15 of the case 11 which is opposite to the detection unit 110 with the loading portion 102 interposed therebetween. The position of the illumination unit 115 in the Y direction is the same as that of the observation window 18. The illumination unit 115 can be moved up and down along the Z direction between a set position which is represented by a solid line and where the illumination unit 115 approaches the rear surface 15 through a hole 116 formed in a bottom plate of the loading portion 102 and a retreat position which is represented by a broken line.

Figure 10:
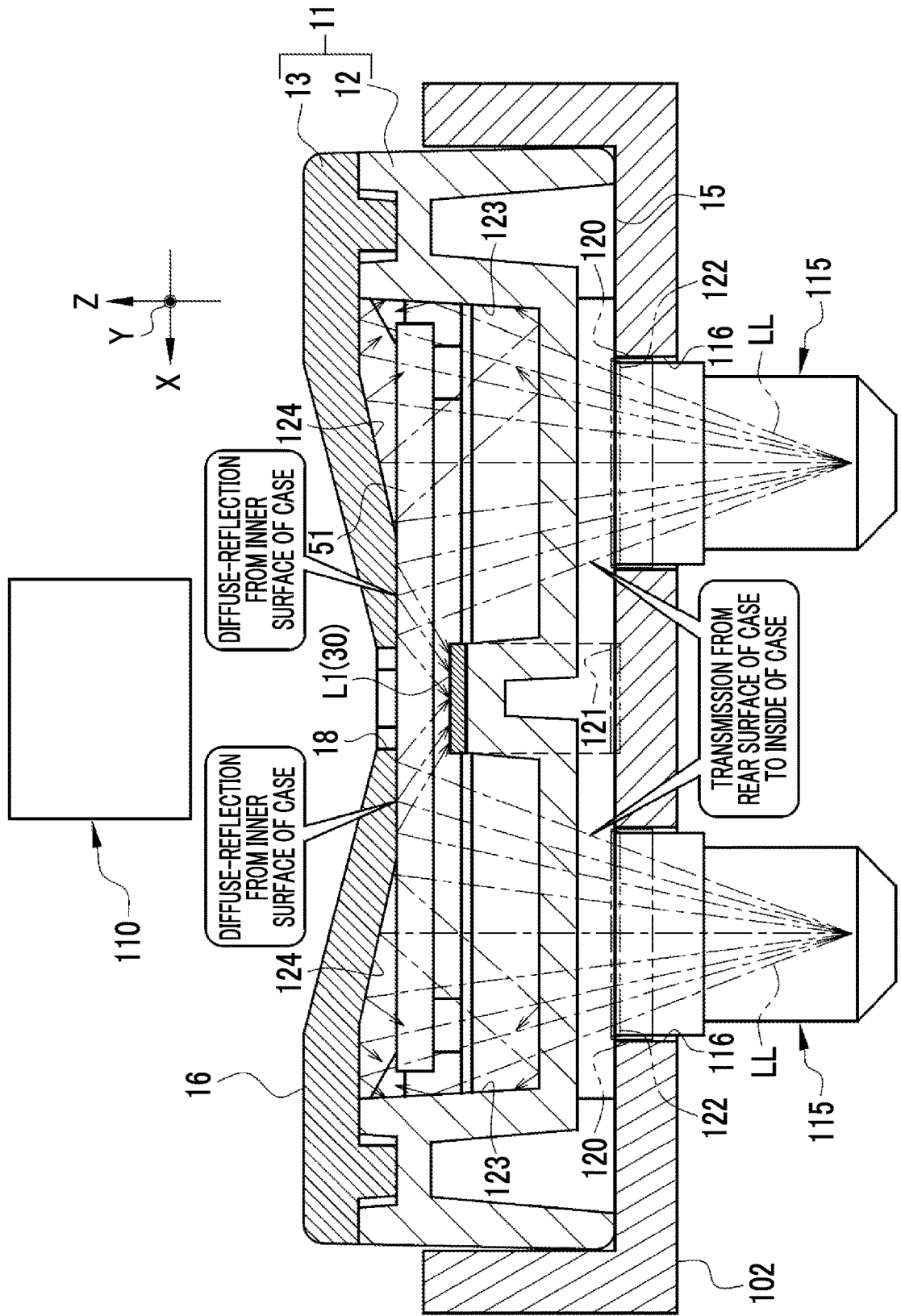
FIG. 10 is a cross-sectional view illustrating the vicinity of a detection unit and an illumination unit.

For example, as illustrated in FIG. 10, there are two illumination units 115. Each of the two illumination units 115 has an emission end portion 120. The two emission end portions 120 come into contact with the rear surface 15 of the case 11 when the illumination units 115 are moved to the set position. The two emission end portions 120 are disposed at positions that are separated from the observation window 18 on the rear surface 15 of the case 11. In other words, the two emission end portions 120 are disposed at positions that deviate from the detection unit 110. Specifically, the two emission end portions 120 are disposed at positions that deviate from the test region L1 in the X direction, which is a direction along the short side of the case 11, on the rear surface 15 of the case 11. Further, the two emission end portions 120 are disposed at the positions of both end portions 122 of the short side of the case 11 with a position 121 corresponding to the test region L1 interposed therebetween.

The illumination light LL is emitted from the emission end portion 120. The illumination light LL incident from the rear surface 15 of the case 11 is transmitted to the inside of the case 11. Then, the case 11 is made of a material that diffuse-reflects the transmitted illumination light LL from an inner surface 123 of the case main body 12 and an inner surface 124 of the cover member 13. Therefore, first, the illumination light LL emitted from the emission end portion 120 is transmitted to the inside of the case 11 from the rear surface 15 of the case 11. The illumination light LL transmitted to the inside of the case 11 is diffuse-reflected from the inner surface 123 of the case main body 12 and the inner surface 124 of the cover member 13. The illumination light LL diffuse-reflected from the inner surfaces 123 and 124 reaches the test region L1, the control region L2, and the color development region L3 and illuminates the test region L1, the control region L2, and the color development region L3 from the surface 16 of the case 11. In addition, the inner surfaces 123 and 124 are examples of an "inner surface of the case" according to the technology of the present disclosure.

Figure 11:
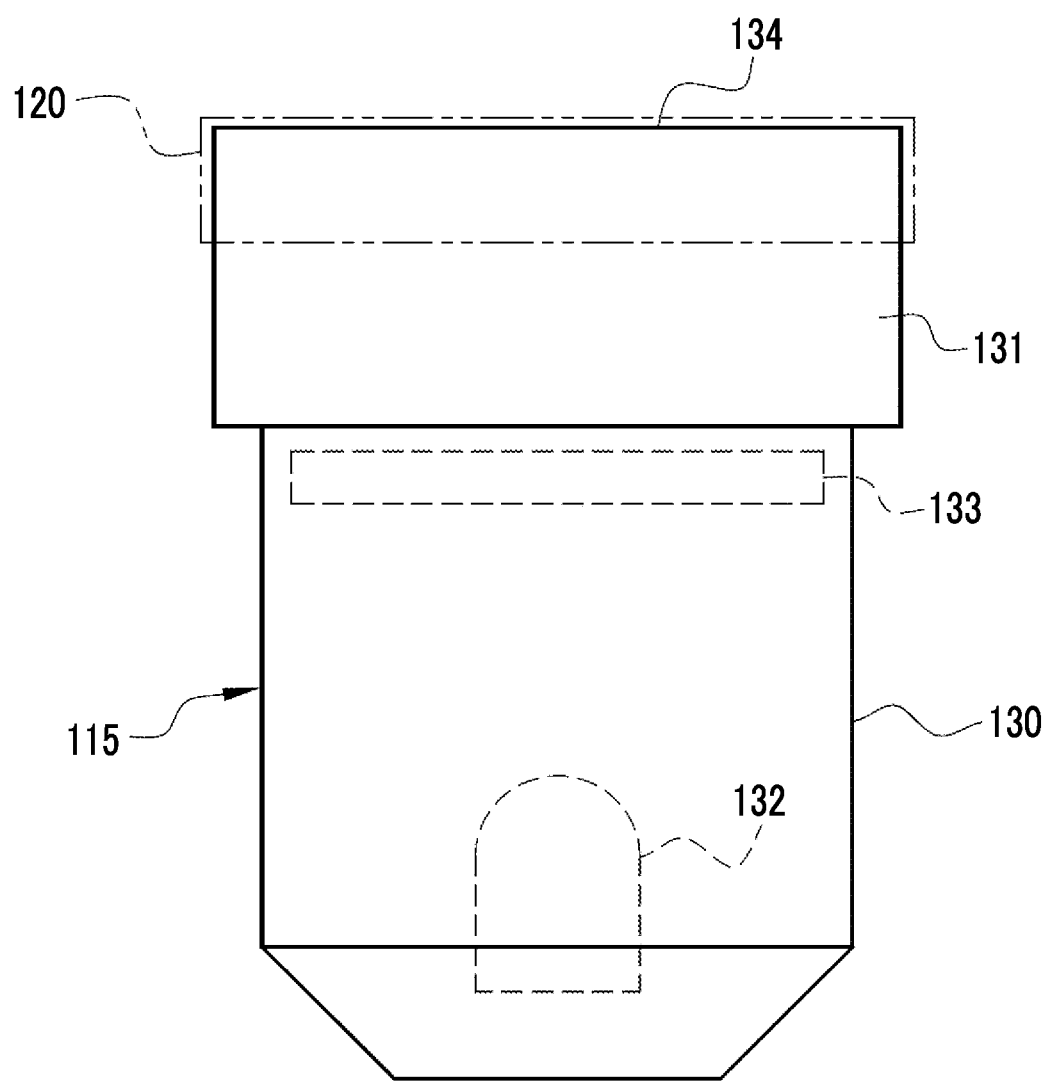
FIG. 11 is a diagram illustrating the illumination unit.

For example, as illustrated in FIG. 11, the illumination unit 115 has an illumination unit main body 130 and an elastic member 131 which each have a cylindrical shape. The illumination unit main body 130 includes a light source 132 that emits the illumination light LL and an emission window 133 through which the illumination light LL is emitted as diffused light to the outside. The light source 132 is a semiconductor light source such as a light emitting diode or a laser diode (LD).

The elastic member 131 is fixed to an end portion of the illumination unit main body 130 which is close to the emission window 133. The elastic member 131 is made of a light-shielding material such as black rubber. One end 134 of the elastic member 131 constitutes a part of the emission end portion 120. The one end 134 of the elastic member 131 is elastically deformed when the illumination unit 115 is moved to the set position and comes into contact with the rear surface 15 of the case 11. Therefore, the one end 134 of the elastic member 131 is closely attached to the rear surface 15 of the case 11 without a gap. That is, the elastic member 131 functions as a suppression portion that suppresses the leakage light of the illumination light LL from the emission end portion 120 to the surroundings.

Figure 12:
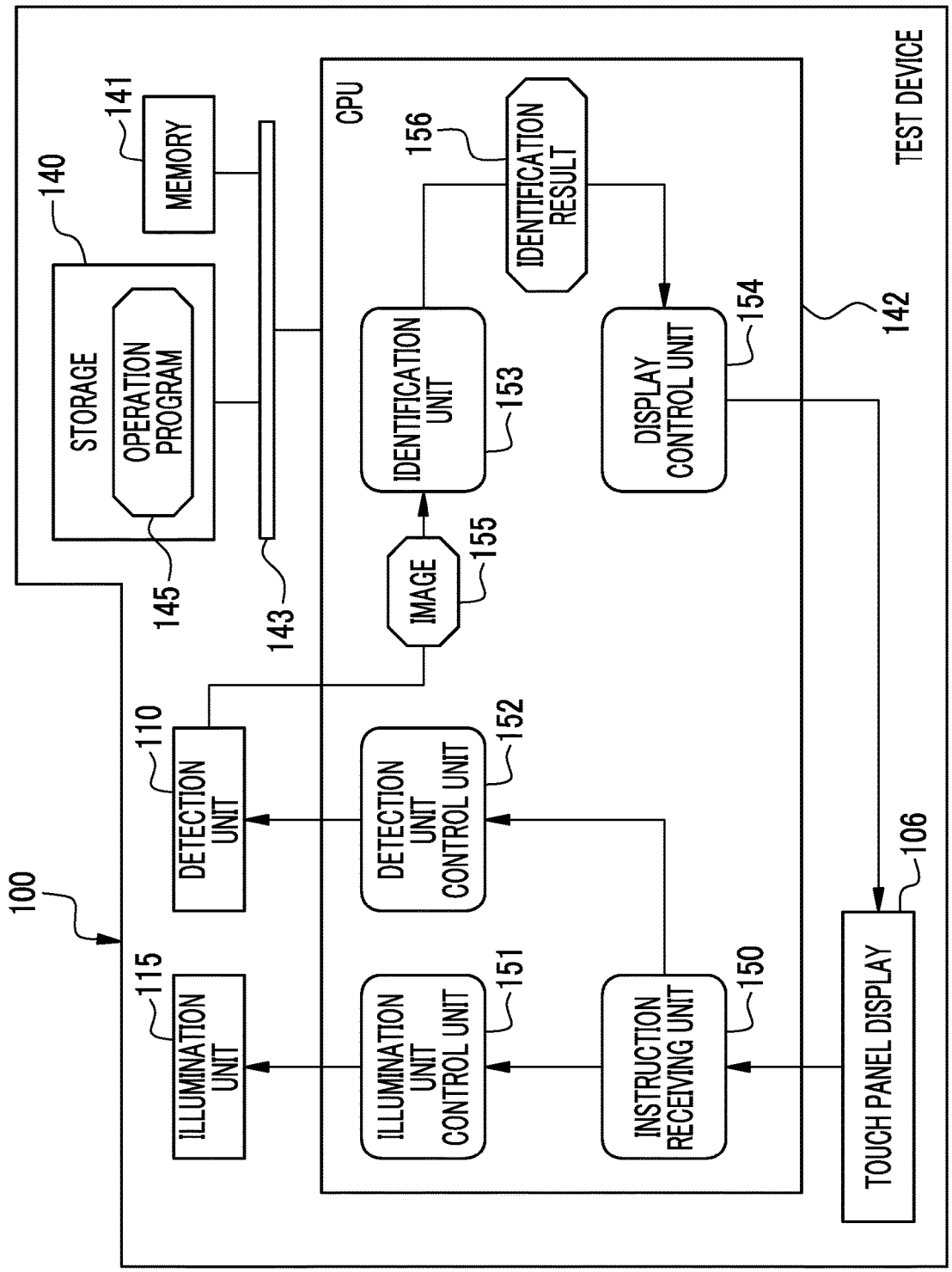
FIG. 12 is a block diagram illustrating a processing unit of a CPU of the test device.

For example, as illustrated in FIG. 12, the test device 100 comprises a storage 140, a memory 141, and a central processing unit (CPU) 142. The storage 140, the memory 141, and the CPU 142 are connected to each other through a bus line 143. The storage 140, the memory 141, the CPU 142, and the bus line 143 constitute a computer.

The storage 140 is, for example, a hard disk drive or a solid state drive. The memory 141 is a work memory that is used by the CPU 142 to perform processes. The CPU 142 loads a program stored in the storage 140 to the memory 141 and performs a process corresponding to the program. Therefore, the CPU 142 controls the overall operation of each unit of the test device 100.

An operation program 145 is stored in the storage 140. The operation program 145 is an application program for causing the computer to function as the test device 100 according to the present disclosure. Further, the storage 140 also stores information necessary for identifying the color development state of the test region L1 in addition to the operation program 145.

In a case in which the operation program 145 is started, the CPU 142 functions as an instruction receiving unit 150, an illumination unit control unit 151, a detection unit control unit 152, an identification unit 153, and a display control unit 154 in cooperation with the memory 141 and the like.

The instruction receiving unit 150 receives various operation instructions from the user through the touch panel display 106. For example, the instruction receiving unit 150 receives a test start instruction. In a case in which the test start instruction is received, the instruction receiving unit 150 outputs a signal indicating that the test start instruction has been received to the illumination unit control unit 151 and the detection unit control unit 152.

The illumination unit control unit 151 controls the operation of the illumination unit 115. The illumination unit control unit 151 moves the illumination unit 115 from the retreat position to the set position or conversely moves the illumination unit 115 from the set position to the retreat position. Further, the illumination unit control unit 151 controls the turning on and turning off of the light source 132 of the illumination unit 115.

The detection unit control unit 152 controls the operation of the detection unit 110. The detection unit control unit 152 drives the imaging element 112 of the detection unit 110 such that the imaging element 112 outputs an image 155 including the test region L1 or the like irradiated with the illumination light LL. The detection unit 110 outputs the image 155 to the identification unit 153.

The identification unit 153 analyzes the image 155 from the detection unit 110 to identify the color development state of the test region L1. The identification unit 153 outputs an identification result 156 to the display control unit 154.

The display control unit 154 controls the display of various kinds of information on the touch panel display 106. For example, the display control unit 154 displays the identification result 156 from the identification unit 153 on the touch panel display 106.

Figure 13:
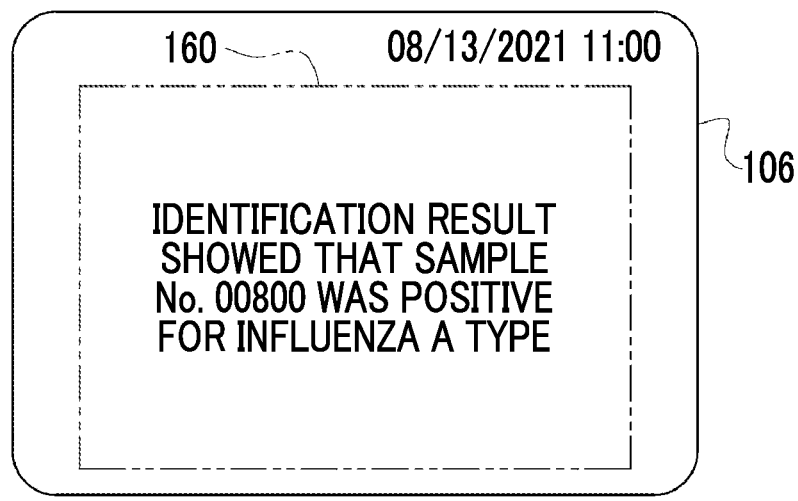
FIG. 13 is a diagram illustrating a touch panel display on which a message indicating an identification result is displayed.

For example, as illustrated in FIG. 13, the display control unit 154 displays a message 160 indicating the identification result 156 on the touch panel display 106. FIG. 13 illustrates a case in which the identification result 156 is positive for influenza A.

Figure 14:
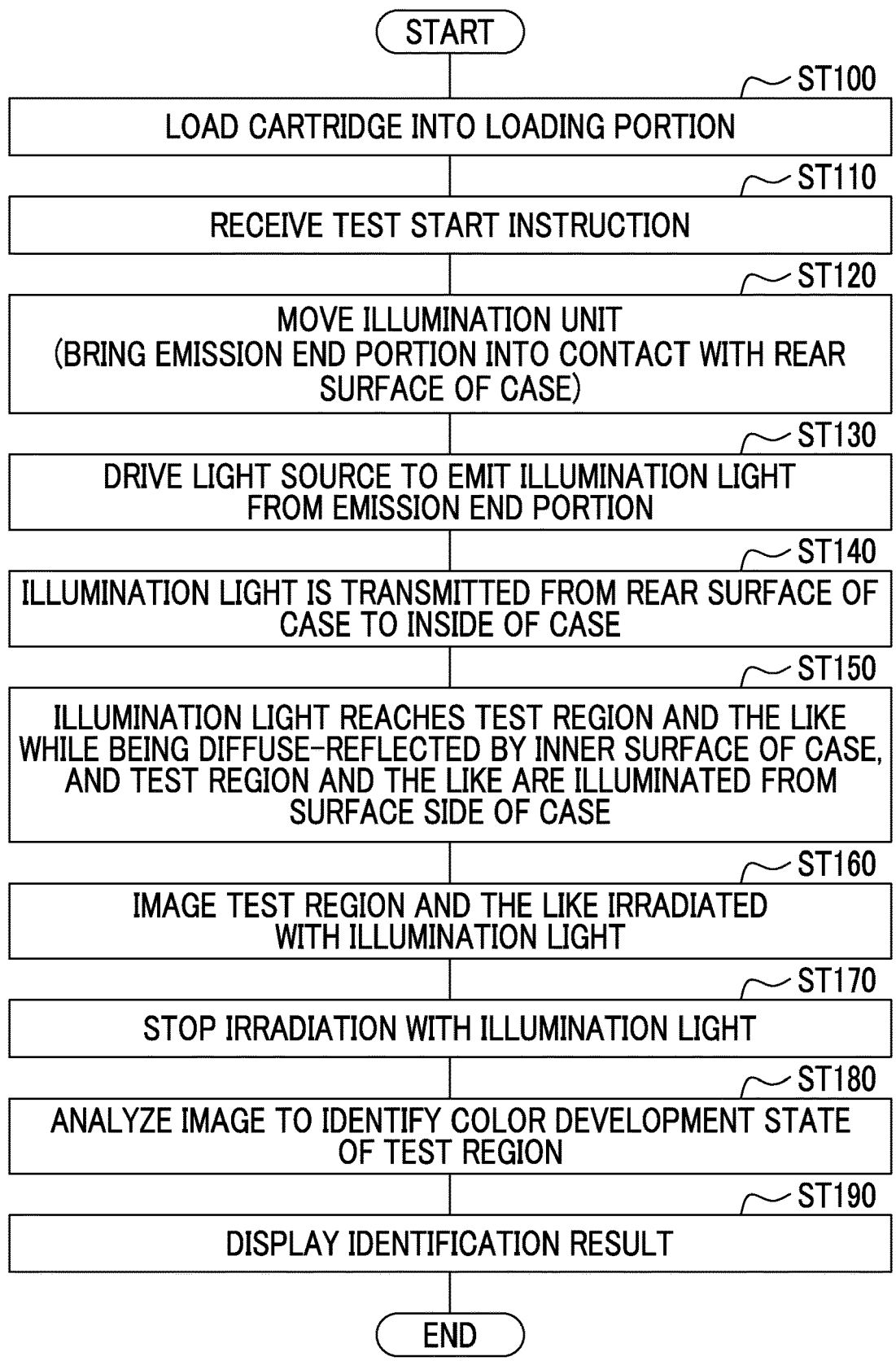
FIG. 14 is a flowchart illustrating a processing procedure of the test device.

Next, the operation of the above-mentioned configuration will be described with reference to, for example, a flowchart illustrated in FIG. 14. First, the user performs the processes in Steps ST1 to ST6 illustrated in FIG. 6. Then, the power switch 105 is operated to turn on the test device 100, and the operation program 145 is started. In this case, the illumination unit 115 is at the retreat position. In a case in which the operation program 145 is started, the CPU 142 of the test device 100 functions as the instruction receiving unit 150, the illumination unit control unit 151, the detection unit control unit 152, the identification unit 153, and the display control unit 154 as illustrated in FIG. 12.

The user opens the lid 104 and loads the cartridge 10 subjected to the process in Step ST6 illustrated in FIG. 6 into the loading portion 102 through the loading port 103 (Step ST100). Then, the user closes the lid 104.

Then, the user operates the touch panel display 106 to input the test start instruction. The instruction receiving unit 150 receives the test start instruction (Step ST110). Then, the instruction receiving unit 150 outputs a signal indicating that the test start instruction has been received to the illumination unit control unit 151 and the detection unit control unit 152.

The illumination unit 115 is moved from the retreat position to the set position under the control of the illumination unit control unit 151. Then, the emission end portion 120, specifically, one end 134 of the elastic member 131, is brought into contact with the rear surface 15 of the case 11 (Step ST120).

Then, the light source 132 of the illumination unit 115 is driven under the control of the illumination unit control unit 151, and the illumination light LL is emitted from the emission end portion 120 (Step ST130). As illustrated in FIG. 10, the illumination light LL emitted from the emission end portion 120 is transmitted from the rear surface 15 of the case 11 to the inside of the case 11 (Step ST140). The illumination light LL transmitted to the inside of the case 11 reaches the test region L1 and the like while being diffuse-reflected by the inner surfaces 123 and 124 of the case 11 and illuminates the test region L1 and the like from the surface 16 (Step ST150).

Then, the imaging element 112 of the detection unit 110 is driven to image the test region L1 and the like irradiated with the illumination light LL under the control of the detection unit control unit 152 (Step ST160). The image 155 obtained in this way is output from the detection unit 110 to the identification unit 153. After the image 155 is captured, the detection unit control unit 152 turns off the light source 132, and the emission of the illumination light LL is stopped (Step ST170).

The identification unit 153 analyzes the image 155 to identify the color development state of the test region L1 (Step ST180). The identification result 156 is output from the identification unit 153 to the display control unit 154.

As illustrated in FIG. 13, the message 160 indicating the identification result 156 is displayed on the touch panel display 106 under the control of the display control unit 154 (Step ST190). In this way, the immunochromatographic test for one cartridge 10 ends.

As described above, the test device 100 comprises the loading portion 102 into which the cartridge 10 is loaded, the illumination unit 115 having the emission end portion 120, through which the illumination light LL illuminating the test region L1 whose color development state changes depending on whether or not the test substance 73 is included in the sample is emitted, and the detection unit 110 that optically detects the color development state of the test region L1 irradiated with the illumination light LL. The cartridge 10 has the strip 14 provided with the test region L1 and the case 11 in which the strip 14 is accommodated and in which the observation window 18 for observing the test region L1 from the outside is formed in the surface 16. The emission end portion 120 is disposed at a position that is separated from the observation window 18 on the rear surface 15 of the case 11. The detection unit 110 is disposed at a position that faces the observation window 18 in the surface 16 of the case 11.

The case 11 of the cartridge 10 is made of a material that transmits the illumination light LL incident from the rear surface 15 to the inside and that diffuse-reflects the transmitted illumination light LL from the inner surfaces 123 and 124. Therefore, the illumination light LL is transmitted to the inside of the case 11 from the rear surface 15 of the case 11, reaches the test region L1 while being diffuse-reflected by the inner surfaces 123 and 124 of the case 11, and illuminates the test region L1 from the surface 16.

According to the above configuration, there is no concern that impurities mixed with the strip 14 will be reflected in the image 155 and that the color development state of the test region L1 will be misidentified, unlike the test device disclosed in JP2002-267664A that illuminates the test region L1 from the rear surface 15. In addition, as in the aspect in which the emission end portion 120 is disposed next to the detection unit 110 and the test region L1 is irradiated with the illumination light LL in the oblique direction, there is no concern that a sufficient amount of illumination light will not reach the test region L1 due to, for example, the eclipse of the illumination light LL at the edge of the observation window 18 and that the color development state of the test region L1 will be misidentified. Therefore, it is possible to reduce the concern that the color development state of the test region L1 will be misidentified.

As illustrated in FIG. 10, the emission end portion 120 is disposed at the position that deviates from the test region L1 in the X direction which is a direction along the short side of the case 11 on the rear surface 15 of the case 11 opposite to the surface 16 in which the observation window 18 is formed.

In addition to the observation window 18, the dropping port 17, the first pressing operation portion 19, and the second pressing operation portion 20 are provided on the surface 16 of the case 11. Further, the detection unit 110 is disposed on the side of the surface 16 of the case 11. Therefore, when the emission end portion 120 is disposed on the side of the surface 16 of the case 11, there are many restrictions. However, in this example, the emission end portion 120 is disposed on the rear surface 15 of the case 11 as described above. Therefore, flexibility is higher than that when the emission end portion 120 is disposed on the side of the surface 16 of the case 11.

Further, as illustrated in FIG. 10, there are two emission end portions 120, and the two emission end portions 120 are disposed at the positions of both end portions 122 of the short side of the case 11 with the position 121 corresponding to the test region L1 interposed therebetween. Therefore, it is possible to reduce the uneven irradiation of the test region L1 with the illumination light LL.

The emission end portion 120 comes into contact with the rear surface 15 of the case 11. Therefore, it is possible to reduce the illumination light LL that is not transmitted through the inside of the case 11 as much as possible and to improve the utilization efficiency of the illumination light LL.

As illustrated in FIG. 11, the elastic member 131 is provided as the suppression portion for suppressing the leakage light of the illumination light LL from the emission end portion 120 to the surroundings. The elastic member 131 has one end 134 that constitutes a part of the emission end portion 120, is elastically deformed when coming into contact with the rear surface 15 of the case 11, and is made of a light-shielding material. The leakage light of the illumination light LL from the emission end portion 120 to the surroundings becomes noise in a case in which the color development state of the test region L1 is identified. Therefore, the provision of the elastic member 131 as the suppression portion makes it possible to further reduce the concern that the color development state of the test region L1 will be misidentified.

According to the elastic member 131, the one end 134 is closely attached to the rear surface 15 of the case 11 without a gap. Therefore, it is possible to more effectively suppress the leakage light of the illumination light LL from the emission end portion 120 to the surroundings.

The light source 132 of the illumination unit 115 is a semiconductor light source. The semiconductor light source is smaller than a light source such as a xenon lamp. Therefore, the use of the light source 132 as a semiconductor light source makes it possible to contribute to miniaturizing the test device 100.

As illustrated in FIG. 7, the diffused light transmittance of the translucent material forming the case 11 for visible light having a wavelength of 420 nm to 680 nm is equal to or greater than 1% and equal to or less than 40% when the transmission distance is 2 mm. Therefore, in addition to white light, light of various colors, such as red light having a center wavelength of about 650 nm or green light having a center wavelength of about 550 nm, can be used as the illumination light LL. Since the number of choices of the color of the illumination light LL can be increased, it is possible to easily select the illumination light LL having an appropriate color that makes it easy to identify the color development state according to the color that the test region L1 and the like develop.

When the diffused light transmittance of the translucent material forming the case 11 is less than 1%, the amount of illumination light LL is too small, and it is difficult to secure the amount of light required to identify the color development state of the test region L1 and the like. On the other hand, when the diffused light transmittance of the translucent material forming the case 11 is greater than 40%, the amount of light that is emitted to the outside of the case 11 without being diffuse-reflected by the inner surfaces 123 and 124 of the case 11 increases. This light becomes leakage light that does not contribute as the illumination light LL for the test region L1 and the like. The leakage light is unnecessary light that is directly incident on the detection unit 110 without passing through the test region L1 and the like. In a case in which the diffused light transmittance is greater than 40% as described above, the amount of unnecessary light caused by the leakage light increases. However, in this example, since the diffused light transmittance of the translucent material is equal to or less than 40%, it is possible to reduce the amount of unnecessary light caused by the leakage light.

Further, in this example, the parallel light transmittance of the translucent material forming the case 11 is equal to or less than 0.1%. As the parallel light transmittance with respect to the diffused light transmittance becomes lower, the light diffusivity of the translucent material is more improved. Further, as the parallel light transmittance becomes lower, the amount of illumination light LL which travels straight inside the case 11 and is emitted to the outside of the case 11, that is, unnecessary light, becomes smaller. When the diffused light transmittance of the translucent material forming the case 11 is equal to or less than 40% and the parallel light transmittance is equal to or less than 0.1%, it is possible to substantially eliminate unnecessary light which travels straight inside the case 11 and is emitted to the outside of the case 11 while ensuring the light diffusivity of the case 11. Therefore, it is possible to further reduce the concern that the color development state of the test region L1 will be misidentified.

In addition, the light transmission characteristics of the translucent material forming the case 11 are not limited to those illustrated in FIG. 7. For example, the light transmission characteristics illustrated in FIG. 15 may be used.

Figure 15:
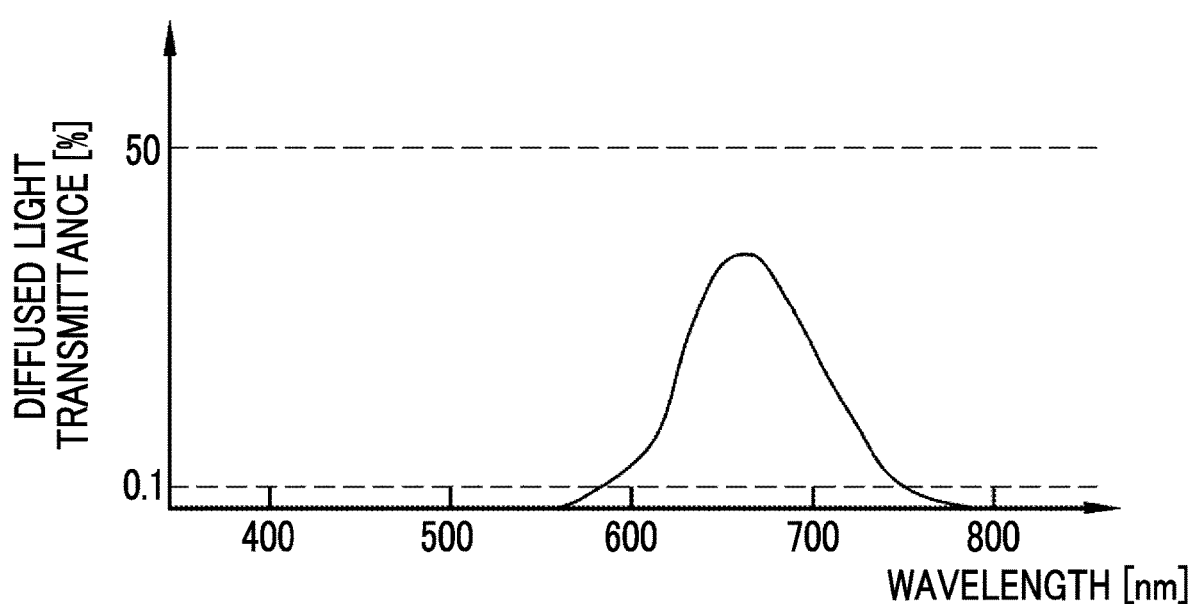
FIG. 15 is a graph illustrating another example of the diffused light transmittance of the translucent material forming the case.

In FIG. 15, the diffused light transmittance of the translucent material forming the case 11 for light having at least a specific wavelength is equal to or greater than 0.1% and equal to or less than 50% when the transmission distance is 2 mm. This specific wavelength is not particularly limited. FIG. 15 illustrates a case in which the diffused light transmittance is equal to or greater than 0.1% and equal to or less than 50% for red light having a central wavelength of about 650 nm. The translucent material having the light transmission characteristics is, for example, a resin material including a large number of red components. In addition, the wavelength of 650 nm is an example of a "specific wavelength" according to the technology of the present disclosure.

As described above, in a case in which a translucent material having a high diffused light transmittance of red light is used and red light is used as the illumination light LL, it is possible to obtain the amount of light required for identifying the color development state of the test region L1 and the like. Of course, since white light includes a red wavelength component, it is possible to combine the translucent material with the white illumination light LL. Since the test region L1 and the like are irradiated with red light, it is easy to identify the color development state of the test region L1, for example, in a case in which the test region L1 develops a color other than red. Even for the translucent material having the light transmittance characteristics illustrated in FIG. 15, in a case in which the lower limit of the diffused light transmittance is equal to or greater than 0.1%, it is possible to secure the amount of light required for identifying the color development state of the test region L1 and the like, which is preferable. In a case in which the upper limit of the diffused light transmittance is less than 50%, it is possible to suppress unnecessary light caused by the leakage light.

When the diffused light transmittance of the translucent material forming the case 11 for light having the specific wavelength is equal to or greater than 0.1% and equal to or less than 50% or less, it is preferable that the parallel light transmittance for the light having the specific wavelength is equal to or less than 0.5%. When the parallel light transmittance is equal to or less than 0.5% assuming that the diffused light transmittance for the light having the specific wavelength is within the above-mentioned range, it is possible to substantially eliminate unnecessary light which travels straight inside the case 11 and is then emitted to the outside of the case 11 while ensuring the light diffusivity of the case 11. Therefore, it is possible to further reduce the concern that the color development state of the test region L1 will be misidentified.

As described above, the wavelength of 650 nm illustrated in FIG. 15 is an example and may be a wavelength other than red light such as green light having a center wavelength of about 550 nm. The specific wavelength may be appropriately selected according to the color developed by the test region L1 and the like.

In the example illustrated in FIG. 10, the two emission end portions 120 are the emission end portions 120 of the two illumination units 115. However, the present disclosure is not limited thereto. A light guide having one incident end portion and two emission end portions 120 bifurcated from the one incident end portion may be connected to one illumination unit 115 having one light source 132, thereby preparing two emission end portions 120.

Figure 16:
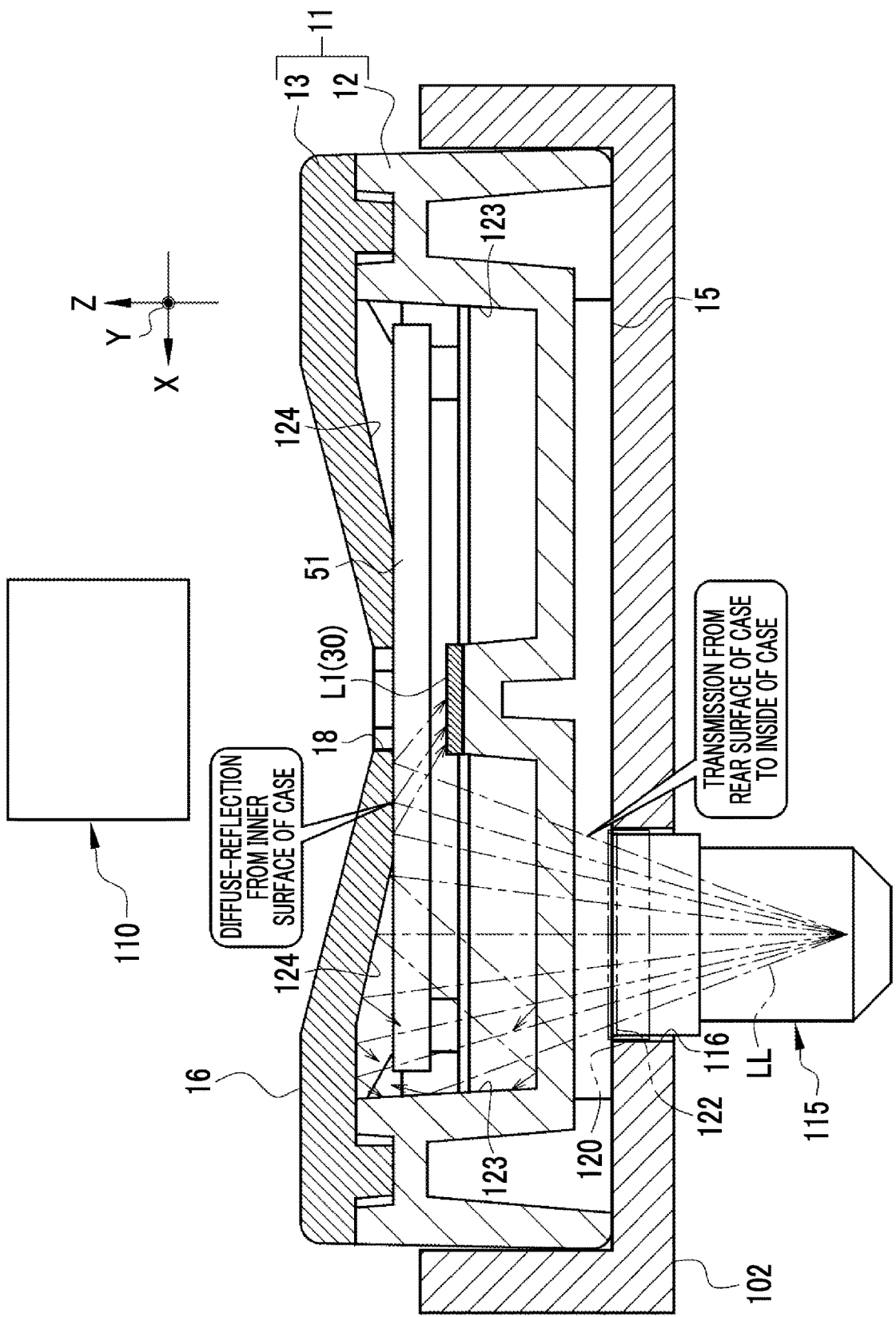
FIG. 16 is a diagram illustrating an aspect in which a test region is illuminated with illumination light from one illumination unit.

Further, in the example illustrated in FIG. 10, the two emission end portions 120 are disposed at the positions of both end portions 122 of the short side of the case 11 with the position 121 corresponding to the test region L1 interposed therebetween. However, the present disclosure is not limited thereto. For example, as illustrated in FIG. 16, in a case in which the amount of illumination light LL emitted to the test region L1 and the like is sufficient, the number of emission end portions 120 (illumination units 115) may be one.

The number of emission end portions 120 is not limited to two or one. Three or more emission end portions 120 may be disposed.

Figure 17:
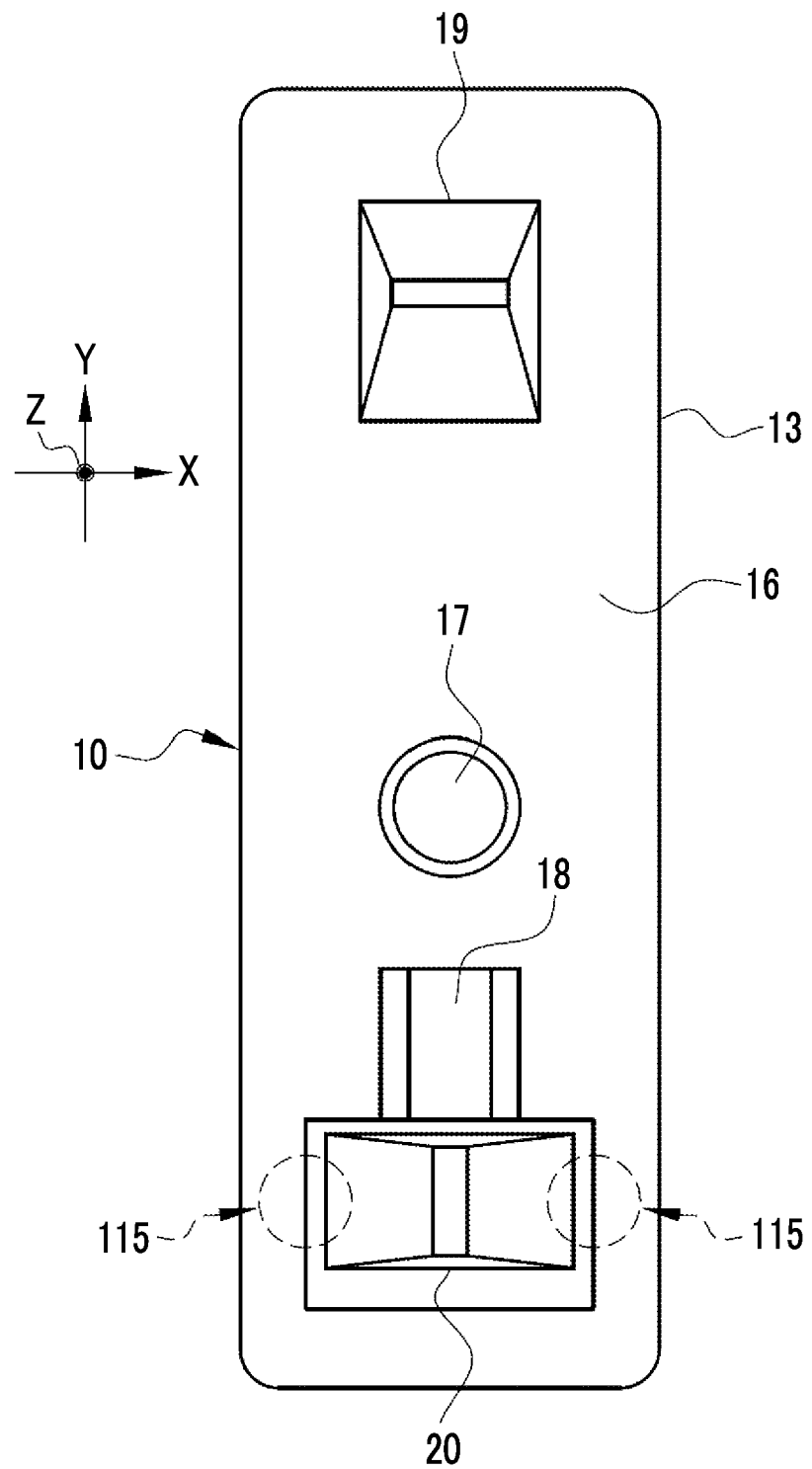
FIG. 17 is a diagram illustrating an example in which the illumination unit is disposed at a position deviating from an observation window.

The position of the illumination unit 115 in the Y direction may not necessarily be the same as the position of the observation window 18. For example, as illustrated in FIG. 17, the position of the illumination unit 115 in the Y direction may be the same as that of the second pressing operation portion 20 and may deviate from the observation window 18 in the Y direction. The position where the illumination unit 115 is disposed is not particularly limited as long as the illumination light LL is diffuse-reflected by the inner surfaces 123 and 124 of the case 11 and reaches the test region L1 and the like. Therefore, the illumination unit 115 may be disposed not on the side of the rear surface 15 of the case 11 but on the side of the surface 16 of the case 11, and the illumination light LL may be incident on the inside of the case 11 from the surface 16. Further, the illumination unit 115 may be disposed on the side surface of the case 11 such that the illumination light LL is incident on the inside of the case 11 from the side surface.

The emission end portion 120 may not come into contact with the rear surface 15 of the case 11. In addition, the suppression portion is not limited to the elastic member 131 given as an example. The suppression portion may be a simple light-shielding cap that does not have elasticity. As the suppression portion, a recessed portion into which the emission end portion 120 is fitted may be provided in the rear surface 15 of the case 11.

The inner surfaces 123 and 124 of the case 11 may be textured or matted such that the illumination light LL is easily diffuse-reflected. On the contrary, it is preferable to perform a smoothing process on the rear surface 15 of the case 11 on which the illumination light LL is incident.

In the above-described embodiment, the operation of pressing the first pressing operation portion 19 and the second pressing operation portion 20 is performed by the user. However, both pressing operations may be performed by the test device 100. In this case, the user only needs to perform the operation of dropping the lysate 72 to the dropping port 17. Further, the operation of pressing the first pressing operation portion 19 may be performed by the user, and the operation of pressing the second pressing operation portion 20 may be performed by the test device 100. In this case, the following configuration may be used: the cartridge 10 is loaded into the test device 100 such that the first pressing operation portion 19 is exposed to the outside, and, after the cartridge 10 is loaded into the test device 100, the user presses the first pressing operation portion 19.

The light source 132 may be an electro-luminescence (EL) element. In addition, the detection unit 110 may be configured by a reflective photodiode.

In the above-described embodiments, for example, the following various processors can be used as a hardware structure of processing units performing various processes. The various processors include, for example, the CPU 142 which is a general-purpose processor executing software (operation program 145) to function as various processing units, a programmable logic device (PLD), such as a field programmable gate array (FPGA), which is a processor whose circuit configuration can be changed after manufacture, and/or a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs and/or a combination of a CPU and an FPGA). Further, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As such, various processing units are configured using one or more of the various processors as the hardware structure.

In addition, specifically, an electric circuit (circuitry) obtained by combining circuit elements, such as semiconductor elements, can be used as the hardware structure of the various processors.

In the technology of the present disclosure, the above-described various embodiments and/or various modification examples may be combined with each other. In addition, the present disclosure is not limited to the above-described embodiments, and various configurations can be used without departing from the gist of the present disclosure. Furthermore, the technology of the present disclosure extends to a storage medium that non-temporarily stores a program, in addition to the program.

The above descriptions and illustrations are detailed descriptions of portions related to the technology of the present disclosure and are merely examples of the technology of the present disclosure. For example, the above description of the configurations, functions, operations, and effects is the description of examples of the configurations, functions, operations, and effects of portions according to the technology of the present disclosure. Therefore, unnecessary portions may be deleted or new elements may be added or replaced in the above descriptions and illustrations without departing from the gist of the technology of the present disclosure. In addition, the description of, for example, common technical knowledge that does not need to be particularly described to enable the implementation of the technology of the present disclosure is omitted in order to avoid confusion and facilitate the understanding of portions related to the technology of the present disclosure.

In the specification, "A and/or B" is synonymous with "at least one of A or B". That is, "A and/or B" means only A, only B, or a combination of A and B. Further, in the specification, the same concept as "A and/or B" is applied to a case in which the connection of three or more matters is expressed by "and/or".

All of the publications, the patent applications, and the technical standards described in the specification are incorporated by reference herein to the same extent as each individual document, each patent application, and each technical standard are specifically and individually stated to be incorporated by reference.

What is claimed is:

1. A test device that is used for an immunochromatographic test using an immunochromatographic method, the test device comprising:
    a loading portion into which a cartridge is loaded, the cartridge having a strip that is provided with a test region whose color development state changes depending on whether or not a sample includes a test substance and having a case in which the strip is accommodated and in which an observation window for observing the test region from an outside is formed in a surface;
    an illumination unit having an emission end portion through which illumination light for illuminating the test region is emitted and which is disposed at a position separated from the observation window on an outer surface of the case, wherein the emission end portion is disposed at a position within a width of a short side of the case, and that deviates from the observation window in a direction along the short side of the case on a rear surface of the case which is opposite to the surface in which the observation window is formed, wherein the illumination unit is configured to move up and down between a set position where the illumination unit comes into contact with the outer surface of the case, and a retreat position; and
    a detection unit that is disposed at a position facing the observation window on a surface side of the case and that optically detects the color development state of the test region irradiated with the illumination light that is emitted from the illumination unit, transmitted through the outer surface of the case and diffuse-reflected by an inner surface of the case;
    wherein the case is between the illumination unit and the detection unit.

2. The test device according to claim 1,
    wherein two emission end portions are provided, and
    the two emission end portions are disposed at positions of both end portions of the short side of the case with a position corresponding to the test region interposed therebetween.

3. The test device according to claim 1,
    wherein the emission end portion comes into contact with the outer surface of the case.

4. The test device according to claim 1, further comprising:
    a suppression portion that suppresses leakage light of the illumination light from the emission end portion to surroundings.

5. The test device according to claim 4,
    wherein the suppression portion is a light-shielding elastic member having one end that constitutes a part of the emission end portion and is elastically deformed when the one end comes into contact with the outer surface of the case.

6. The test device according to claim 1,
    wherein the illumination unit has a semiconductor light source that emits the illumination light.

7. The test device according to claim 1,
    wherein the cartridge further includes a dropping port for receiving a sample, formed at a central portion of the case in a long side direction thereof, and a pressing operation portion for supplying a reagent to the strip, formed at one end portion of the case in the long side direction thereof, and
    the observation window is formed between the dropping port and the pressing operation portion.

8. A cartridge that is loaded into the loading portion of the test device used for an immunochromatographic test using an immunochromatographic method, the test device including a loading portion into which the cartridge is loaded, the cartridge comprising:
    a strip that is provided with a test region whose color development state changes depending on whether or not a sample includes a test substance; and
    a case in which the strip is accommodated and in which an observation window for observing the test region from an outside is formed in a surface;
    the test device having an illumination unit having an emission end portion through which illumination light for illuminating the test region is emitted and which is disposed at a position separated from the observation window on an outer surface of the case, wherein the emission end portion is disposed at a position within a width of a short side of the case, and that deviates from the observation window in a direction along the short side of the case on a rear surface of the case which is opposite to the surface in which the observation window is formed, wherein the illumination unit is configured to move up and down between a set position where the illumination unit comes into contact with the outer surface of the case, and a retreat position; and
    the test device having a detection unit that is disposed at a position facing the observation window on a surface side of the case and that optically detects the color development state of the test region irradiated with the illumination light that is emitted from the illumination unit, transmitted through the outer surface of the case and diffuse-reflected by an inner surface of the case, wherein the case is made of a material that transmits the illumination light incident from the outer surface to the inside and that diffuse-reflects the transmitted illumination light from an inner surface, and wherein the case is between the illumination unit and the detection unit.

* * * * *